(12) United States Patent
Hunter et al.

(10) Patent No.: US 12,400,061 B2
(45) Date of Patent: Aug. 26, 2025

(54) METHODS AND SYSTEMS FOR PRINTED CIRCUIT BOARD PHYSICAL OUTLINE ESTIMATION AND APPROVAL

(71) Applicant: BOARDERA SOFTWARE INC., Kitchener (CA)

(72) Inventors: Curtis Hunter, Kitchener (CA); David Workman, Kitchener (CA)

(73) Assignee: Boardera Software Inc., Kitchener (CA)

( * ) Notice: Subject to any disclaimer, the term of this patent is extended or adjusted under 35 U.S.C. 154(b) by 789 days.

(21) Appl. No.: 17/376,204

(22) Filed: Jul. 15, 2021

(65) Prior Publication Data

US 2023/0018768 A1 Jan. 19, 2023

(51) Int. Cl.
| | |
|---|---|
| *G06F 30/30* | (2020.01) |
| *G06F 30/392* | (2020.01) |
| *G06F 30/398* | (2020.01) |
| *G06T 7/12* | (2017.01) |
| *G06T 7/13* | (2017.01) |

(52) U.S. Cl.
CPC .......... *G06F 30/392* (2020.01); *G06F 30/398* (2020.01); *G06T 7/12* (2017.01); *G06T 7/13* (2017.01); *G06T 2207/30141* (2013.01)

(58) Field of Classification Search
CPC .. G06F 30/392; G06F 30/398; G06F 2115/12; G06T 7/12; G06T 7/13; G06T 2207/30141
See application file for complete search history.

(56) References Cited

U.S. PATENT DOCUMENTS

| | | | |
|---|---|---|---|
| 7,627,838 B2 | 12/2009 | Keswick | |
| 9,268,895 B2 | 2/2016 | Perry et al. | |
| 10,089,429 B2 | 10/2018 | Hirschman et al. | |
| 10,255,401 B2 | 4/2019 | Meng | |
| 10,592,704 B2 | 3/2020 | Brookshire | |
| 10,860,776 B1 | 12/2020 | To et al. | |
| 11,449,654 B1 | 9/2022 | Warren et al. | |
| 2015/0135157 A1 | 5/2015 | Lin et al. | |
| 2019/0012424 A1* | 1/2019 | Brookshire | .......... H05K 3/0005 |
| 2022/0012405 A1 | 1/2022 | Oron et al. | |

* cited by examiner

*Primary Examiner* — Jack Chiang
*Assistant Examiner* — Brandon Bowers
(74) *Attorney, Agent, or Firm* — Dickinson Wright LLP; Matthew D. Powell

(57) ABSTRACT

An aspect of the disclosed embodiments is a system for printed circuit board (PCB) outline generation including at least one processor configured to receive one or more electronic PCB design files defining a PCB design. The at least one processor is also configured to process the one or more electronic PCB design files to distinguish physical features of the PCB design from non-physical (auxiliary) features of the PCB design. The at least one processor is also configured to generate an estimated physical outline for the PCB design that encompasses the physical features and excludes the auxiliary features. The at least one processor is also configured to electronically store the estimated physical outline in association with the PCB design. Other aspects are included.

30 Claims, 19 Drawing Sheets

METHODS AND SYSTEMS FOR PRINTED CIRCUIT BOARD PHYSICAL OUTLINE ESTIMATION AND APPROVAL

TECHNICAL FIELD

The following relates generally to printed circuit board design and manufacturing, and more particularly to methods and systems for printed circuit board physical outline estimation and approval.

BACKGROUND

A printed circuit board (PCB) is a device designed to both physically support and electrically interconnect electronic components of a circuit or circuits of an electronic device. A PCB may include one or more layers of electrically conductive traces laminated atop respective surfaces of a non-conducting supportive substrate, and extending between electrically conductive component pads and/or electrically conductive vias formed through the substrate for electrically interconnecting multiple layers of the PCB. A PCB may include additional layers, such as layer(s) of other material(s) patterned to apply words/symbols onto the PCB substrate and/or to provide patterned protective coatings. Electrical and electronic components may be electrically and physically connected through openings in such patterned protective coatings to respective conductive pads and/or vias of a PCB using an electrically conductive material such as solder. The assembly including PCB and connected components is generally known as a PCB assembly (PCBA).

A PCB design may be created by an engineer or other user of a computer aided design (CAD) software application. Such a CAD software application may be configured to enable creation of the PCB design using a computer user interface (UI). While specifying physical features at each layer a user may also embed, as part of the layer, additional information about the PCB design, such as notes, tables, stackup information and/or other information. Such additional information may be of aid to the user and may be intended to be read and interpreted by a downstream user. Such a downstream user may be, for example, a manufacturer who will physically manufacture the PCB and/or the PCBA. However, when the PCB design is exported as PCB design files for downstream use, such additional information embedded in a given layer may be encoded as though it depicts physical features.

When additional information is encoded as though it depicts physical features, the additional information needs to be distinguished from physical features as what may be regarded as auxiliary features, before the PCB design files are to be used to determine dimensions of the PCB itself, determine pricing according to the dimensions, display accurate renderings of the physical aspects of the board, and/or configure PCB and/or PCBA manufacturing machinery. Prior to configuring the manufacturing machinery, therefore, a downstream user may be required to study the PCB design files and use his or her judgement to discern, for each layer, between physical features and auxiliary features. The downstream user may then attempt to generate modified PCB design files in which only that which the downstream user feels is a physical feature is to be regarded as a physical feature, and in which that which the downstream user feels are auxiliary features are to be excluded. It can be time-consuming for a downstream user to apply his or her judgement to discern auxiliary from physical features and then to make corresponding modifications to a given set of PCB design files. Time-consuming manual processes such as these can drive up costs of manufacturing, and can introduce delays. Furthermore, due to the nature of the PCB manufacturing supply chain, PCB manufacturers may receive PCB design files from multiple different sources representing various different kinds and sizes of electronics projects for various different applications. The volume, complexity and variety of such electronics projects all increase the likelihood that a downstream user tasked with studying and modifying PCB design files for a large number of electronics projects may make mistakes, increasing delays and potentially leading to errors in manufacturing.

SUMMARY

An aspect of the disclosed embodiments is a system for printed circuit board (PCB) outline approval including a user interface provided on a display device for graphically displaying a representation of a PCB design. The system further includes a user interface provided on the display device for graphically displaying features of the PCB design as encompassed by an automatically estimated physical outline of physical features of the PCB design. The system further includes a user interface control for approving the automatically estimated physical outline as correctly encompassing the physical features of the PCB design.

An aspect of the disclosed embodiments is a method for printed circuit board (PCB) outline approval including graphically displaying, on a display device, a representation of a PCB design. The method also includes graphically displaying, on the display device, features of the PCB design as encompassed by an automatically estimated physical outline of physical features of the PCB design. The method also includes providing a user interface control for approving the automatically estimated physical outline as correctly encompassing the physical features of the PCB design.

An aspect of the disclosed embodiments is a non-transitory computer readable medium embodying a computer program executable on at least one processor for printed circuit board (PCB) outline approval. The computer program includes computer program code for graphically displaying, on a display device, a representation of a PCB design. The computer program also includes computer program code for graphically displaying, on the display device, features of the PCB design as encompassed by an automatically estimated physical outline of physical features of the PCB design. The computer program also includes computer program code for providing a user interface control for approving the automatically estimated physical outline as correctly encompassing the physical features of the PCB design.

An aspect of the disclosed embodiments is a system for printed circuit board (PCB) outline approval including at least one processor configured to automatically generate, based at least on contents of electronic PCB design files, an estimated physical outline for encompassing physical features of a PCB design. The system also includes a user interface for graphically displaying features of the PCB design as encompassed by the estimated physical outline. The system also includes a user interface control for approval of the estimated physical outline based on the estimated physical outline correctly encompassing the physical features of the PCB design.

An aspect of the disclosed embodiments is a method for printed circuit board (PCB) outline approval including automatically generating, based at least on contents of electronic PCB design files, an estimated physical outline for encompassing physical features of a PCB design. The method also includes graphically displaying features of the PCB design as encompassed by the estimated physical outline. The method also includes providing a user interface control for approval of the estimated physical outline based on the estimated physical outline correctly encompassing the physical features of the PCB design.

An aspect of the disclosed embodiments is a non-transitory computer readable medium embodying a computer program executable on at least one processor for printed circuit board (PCB) outline approval. The computer program includes computer program code for automatically generating, based at least on contents of electronic PCB design files, an estimated physical outline for encompassing physical features of a PCB design. The computer program also includes computer program code for graphically displaying features of the PCB design as encompassed by the estimated physical outline. The computer program also includes computer program code for providing a user interface control for approval of the estimated physical outline based on the estimated physical outline correctly encompassing the physical features of the PCB design.

An aspect of the disclosed embodiments is a system for printed circuit board (PCB) outline generation including at least one processor configured to receive one or more electronic PCB design files defining a PCB design. The at least one processor is also configured to process the one or more electronic PCB design files to distinguish physical features of the PCB design from non-physical (auxiliary) features of the PCB design. The at least one processor is also configured to generate an estimated physical outline for the PCB design that encompasses the physical features and excludes the auxiliary features. The at least one processor is also configured to electronically store the estimated physical outline in association with the PCB design.

An aspect of the disclosed embodiments is a method for printed circuit board (PCB) outline generation including receiving one or more electronic PCB design files defining a PCB design. The method also includes processing the one or more electronic PCB design files to distinguish physical features of the PCB design from non-physical (auxiliary) features of the PCB design. The method also includes generating an estimated physical outline for the PCB design that encompasses the physical features and excludes the auxiliary features. The method also includes electronically storing the estimated physical outline in association with the PCB design.

An aspect of the disclosed embodiments is a non-transitory computer readable medium embodying a computer program executable on at least one processor for printed circuit board (PCB) outline generation. The computer program includes computer program code for receiving one or more electronic PCB design files defining a PCB design. The computer program also includes computer program code for processing the one or more electronic PCB design files to distinguish physical features of the PCB design from non-physical (auxiliary) features of the PCB design. The computer program also includes computer program code for generating an estimated physical outline for the PCB design that encompasses the physical features and excludes the auxiliary features. The computer program also includes computer program code for electronically storing the estimated physical outline in association with the PCB design.

These and other aspects of the present disclosure are provided in the following detailed description of the embodiments, the appended claims, and the accompanying figures.

Figure 1:
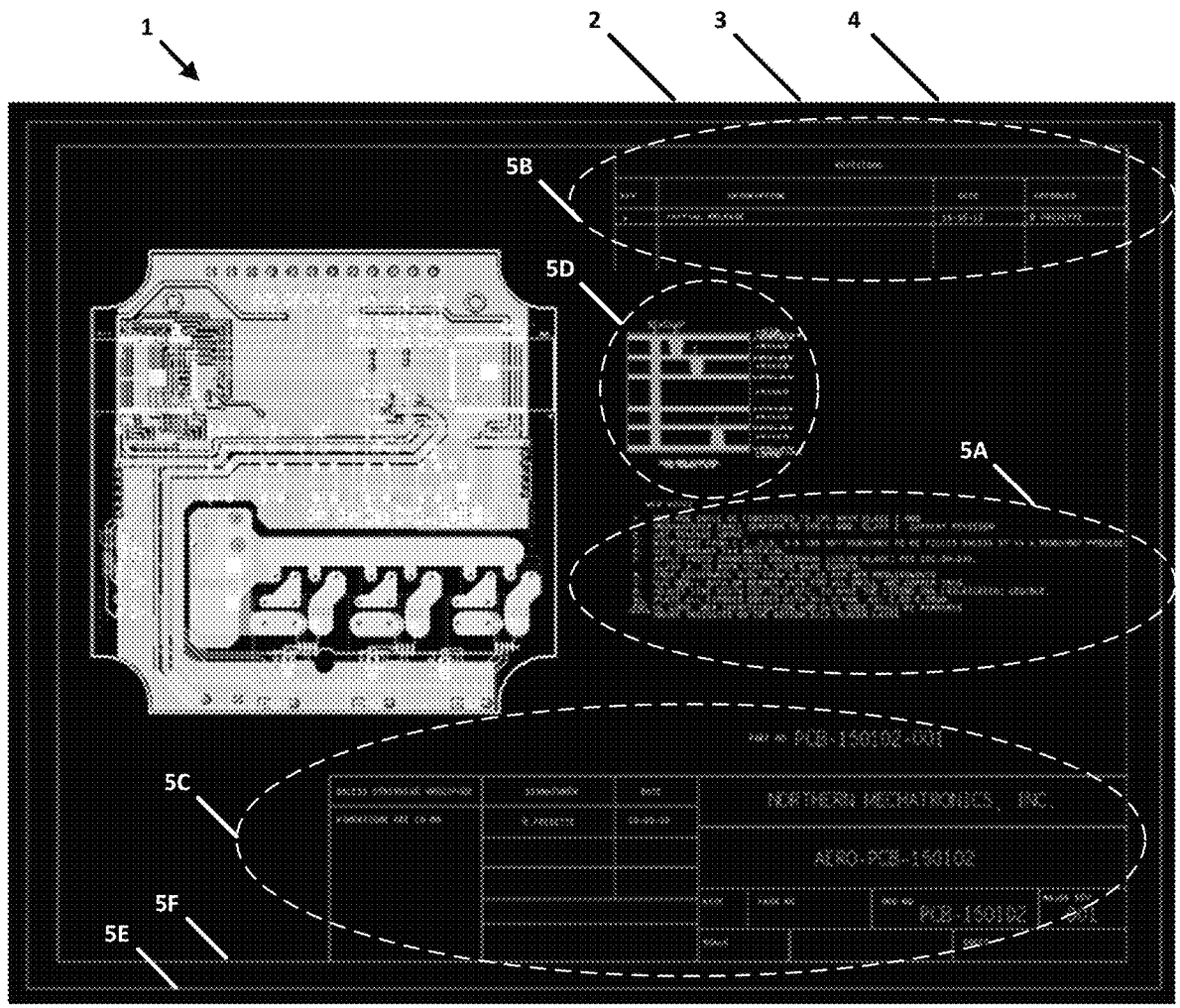
FIG. 1 is a graphical depiction of a printed circuit board (PCB) design, with the graphical depiction including a conductive trace layer, a solder mask layer, a silkscreen layer, with embedded notes, stackup, drill information, and borders that may have been added during a design process by a user.

Other aspects and embodiments will become apparent upon reading the following description.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a printed circuit board (PCB) is a device designed to both physically support and electrically interconnect electronic components of a circuit or circuits of an electronic device. A PCB may include one or more layers of electrically conductive traces laminated atop respective surfaces of a non-conducting supportive substrate, and extending between electrically conductive component pads and/or electrically conductive vias formed through the substrate for electrically interconnecting multiple layers of the PCB. Electrical and electronic components such as transistors, resistors, capacitors, diodes, inductors, integrated circuits (ICs), light-emitting diodes (LEDs), power and/or signal sources and various other components may be electrically and physically connected to respective pads and/or vias of a PCB using an electrically conductive material such as solder, and/or to mechanical anchor points, thereby to assemble the circuit or circuits as a PCB assembly (PCBA).

Prior to assembly of the PCB with the components, a PCB may be manufactured using a number of process steps typically conducted using specialized PCB manufacturing equipment configured and operated by a PCB manufacturer. Such process steps may include selectively etching conductive material applied on at least one size of a suitably-sized piece of non-conductive substrate to form electrically conductive traces and pads, drilling vias and other functional holes through the substrate at respective locations, applying solder atop respective pads and/or vias, applying human and/or machine-readable information about component placement on the PCB, applying protective coatings atop appropriate regions of the PCB, and/or other process steps. Once a PCB is manufactured, components may be electrically and physically connected to the PCB using additional process steps/machinery, thereby to form a PCB assembly (PCBA).

A PCB design may be created by an engineer or other designer with the help of a computer aided design (CAD) software application that is configured to enable creation of the PCB design using a computer user interface (UI). Such a UI may be displayed on a display device such as a screen of a computing device, and may be interacted with using one or more input devices such as a mouse and/or keyboard of the computing device. Using the UI, a user may select and manipulate interconnections of various electrical/electronic components to form and depict a schematic representation of a desired circuit. Once the user is satisfied with the schematic representation, the same or different CAD software applications may then be used to depict and manipulate a physical representation of a PCB corresponding to the circuit represented by the schematic representation.

A physical representation of a circuit may include representations of the shapes, orientations and spatial positions of circuit components themselves with respect to each other and with respect to one or more PCBs. The physical representation may also include representations of the sizes and shapes of each substrate, the respective conductive pads, vias, conductive traces, mask(s), silkscreen(s), and other aspects to be formed on the each substrate or otherwise arranged with respect to the substrate for physically supporting and electrically interconnecting the components. A bill of materials (BOM) may be generated using the software application to provide a list of components and their specifications for sourcing and/or ordering, and to associate the components with particular locations and orientations with respect to the PCB. The physical representation and the BOM may be manipulated using the UI in various ways, thereby to define a computer model of the PCBA reflecting the user's intentions for its physical manufacture.

Once the user is satisfied with the computer model of the PCBA, the computer model may be exported as a set of standardized processor-readable files for downstream use. Each file may include data regarding a respective aspect of the computer model. For example, one file may specify draw/erase commands for conductive material for a first layer of a PCB, and another file may specify draw/erase commands for conductive material for a second layer of the PCB. Yet another file may specify draw/erase commands for solder mask for the first layer of the PCB, and yet another file may specify draw/erase commands for solder mask for the second layer of the PCB. Other files may respectively specify silkscreen layer content and locations for respective layers, drill hole sizes and locations and other aspects for vias through respective layers, component XYRS (X location, Y location, rotation/orientation, and side) placement data for respective sides, and/or other aspects. An outline file defining the PCB physical outline may be automatically generated based on the contents specified by the user for the layers, and included as part of the PCB design files.

PCB design files may be saved in a file system for later use, transmission to another computing device, inspection, subsequent modification of the computer model, and the like. Each file may be named according to its contents and/or in accordance with custom or standard so that it may be properly imported into another computing device, understood by a human user, used to properly configure equipment to manufacture the PCB and thereafter form the PCB and the PCBA, and otherwise used. Various file formatting standards for PCB designs are available, including the Gerber format and the ODB++ format.

While specifying a computer model of a PCBA using a CAD software application, a user may specify shapes, shape orientations, shape locations and other physical features to be included with each layer of the PCB design. For example, for a conductive layer, using the UI a user may specify the shapes and locations of conductive traces, conductive pads, and other electrically conductive features. For a mask layer, using the UI the user may specify the shapes and locations of features that are to block light from passing during a photolithography process. Conversely, the shapes and locations of features that are to permit light to pass during a photolithography process may be specified. For a silkscreen layer, using the UI the user may specify the shapes and locations of markings such as text and/or graphics to be applied to the PCB. When the PCB design files are generated, the features specified by the user may be encoded as draw/erase commands, each of which may include a draw tool change, a polarity change (draw or erase), and a coordinate. Such draw/erase commands are each generally suitable for instructing a manufacturing machine to conduct a draw/erase operation, such as to draw a silkscreen feature, or to etch a conductive material such as copper thereby to create a conductive feature.

While specifying physical features in a given PCB design, it is common for some users to include additional information, such as textual notes, tables, stackup diagrams, drill dimensions and/or other information. A user may wish to embed such additional information to help the user contextualize the computer model of the PCBA for himself or herself and/or to convey additional context or manufacturing details to a downstream user. CAD software applications may provide functions that enable a user to include such additional information as separate from physical features. For example, CAD software may provide additional menus and/or screens for capturing and storing the additional information with the PCB design, and then encoding the PCB design files with the additional information. However, it has become very common to the workflow of some users to embed the additional information in one or more layers along with the physical features. Even if a PCB outline file is included in the PCB design, it is very common for some users to embed additional information within the PCB outline file itself along with the specification of the outline.

When such additional information is included as part of a layer or layers along with the physical features, the additional information may not be regarded by the CAD software as inherently different from the physical features. As a result, the additional information may be encoded by the CAD software as draw/erase commands, or otherwise encoded in the same manner as are the physical features. In the case of additional information in a PCB outline file, the additional information may be encoded in the same manner as is the physical outline information. Because the additional information is encoded in the same manner as the physical features, there is a risk that the additional information will be treated downstream—by another user or by a manufacturing machine—as physical features to be physically produced as part of the PCB or that incorrectly affect the interpretation of the outline of the PCB. For example, notes embedded by a user in a conductive layer of the PCB design, that are otherwise not distinguished from the conductive traces and pads, may result in a manufacturing machine etching the notes in conductive material, such as copper, atop a PCB substrate.

To reduce that chance that additional information embedded by a user in a given layer may undesirably result in the additional information itself being etched or otherwise made manifest on a PCB being manufactured, it is common for a downstream user, such as a manufacturer, to study the PCB design files before configuring a manufacturing machine based on the PCB design files. The downstream user may import the PCB design files into a software application for visual display and study. If, in the downstream user's judgement, there is such additional information in a given layer that should be recognized as auxiliary features and not physical features, the downstream user may create modified PCB design files, for example by redefining a board outline file, creating a new board outline file, deleting from each layer what the downstream user feels might be such auxiliary features so that the outline is not ambiguous to a machine, and/or other modifications. The downstream user may then export the modified PCB design file(s) to provide PCB design files that the downstream user feels either no longer includes the auxiliary features and/or clearly encodes a distinction between auxiliary features and physical features.

Manually searching for and deleting auxiliary features, or otherwise manually distinguishing auxiliary features from physical features can be a time-consuming and subjective exercise. A downstream user, particularly a manufacturer, may not generally be as familiar with the PCB design itself, or with the habits of the engineer/designer from which it originated. As such, the downstream user may need to spend a lot of time studying the PCB design to discern between the physical features and the auxiliary features. During this process, the downstream user may make choices that would not accord with the wishes of the user from which the PCB design originated. The downstream user may incorrectly designate an auxiliary feature as a physical feature and/or incorrectly designate a physical feature as an auxiliary feature. Time of study and creation of errors may increase manufacturing costs, unnecessarily increase PCB board size, and/or unnecessarily and improperly modify the form factor of the PCB board.

Uncertainties between what an original PCB design user intends and what a downstream user interprets is desired may become more likely under certain conditions. Such conditions may include a downstream user being located remotely from the user from which the PCB design originated, a language barrier as between users, an experience barrier as between users, a time difference between users, a downstream user being distracted or experiencing stress or being rushed, and/or because of other human or situational factors. Generally, requiring a downstream user who is unfamiliar with a particular PCB design to discern what its original designer intended, and to modify the PCB design so that auxiliary features are distinguished from physical features, may increase the possibility of errors. Furthermore, the user from which the PCB design originated may learn about any errors only once an incorrectly modified PCB or PCBA has been physically manufactured and delivered for inspection and/or use.

FIG. 1 is a graphical depiction of a printed circuit board (PCB) design 1, as may be commonly displayed on a display device of a computing system. The graphical depiction includes multiple layers, including conductive layer 2, a solder mask layer 3, and a silkscreen layer 4. Such layers 2, 3, 4, and any other layers, may be stacked atop each other as shown in FIG. 1, with each layer being transparent throughout with the exception of points and regions that contain features. In this way, a user can visualize how features in different layers stack atop of each other, so the user can understand and/or confirm how different layers are to be manufactured. For example, in the conductive layer 2, all pixels may be transparent except for those corresponding to features placed by the user within layer 2. Similarly, in the solder mask layer 3, all pixels may be transparent except for those corresponding to features placed by the user within layer 3. User controls may be provided in a UI for enabling selecting of an individual layer, or sub combinations of layers, so that such selections may result in only features in one layer being displayed, features in a sub combination of multiple layers being displayed, or features in all layers being displayed.

As described, from the point of view of a downstream user or machine receiving PCB design files in which auxiliary features are encoded as are physical features, all features are, by default, features available to be physical aspects of the PCB. However, because it is common for some users to embed additional information that is not intended to by physical aspects, it may be necessary to discern which features are physical features and which features are auxiliary features.

In this description, a given layer may include only physical features, may include only auxiliary features, or may include both physical features and auxiliary features. In this description, a physical feature is a feature that is intended to be manufactured as depicted as a physical aspect of the PCB. A physical feature thus has a physical relationship with a substrate of a PCB, and thus may have a particular position, size, length/width, orientation, and/or another physical quality that physically relates to the substrate and/or relates to one or more physical features of the same or of other layers that themselves relate to the substrate. For example, a feature in conductive layer 2 that is intended to depict a conductive trace across a portion of the PCB may be regarded as a physical feature. As another example, a feature in solder mask layer 3 that is intended to depict a mask overlying a conductive pad at a particular location on the PCB may be regarded as a physical feature. As yet another example, a feature in silkscreen layer 4 that is intended to depict words or symbols to be physically deposited at a particular location near to a conductive trace and/or a conductive pad on a PCB may be regarded as a layer feature.

In contrast, in this description an auxiliary feature is a feature that is not itself intended to be manufactured as depicted as a physical aspect of the PCB. An auxiliary feature may depict information describing aspects of one or more physical features and/or about one or more other auxiliary features, in the same and/or a different layer, but is not itself intended to become a physical aspect of the PCB. In FIG. 1, embedded notes 5A, tables 5B, 5C, stackup 5D, drill information 5E and borders 5F, 5G are, in this description, auxiliary features that have been placed by a user in conductive layer 2 along with the physical features that themselves depict conductive traces and/or conductive pads. While such notes 5A, tables 5B, 5C, stackup 5D, drill information 5E and borders 5F, 5G may depict information that describes or refers to physical features, such auxiliary features 5A-5G are not themselves intended to be manufactured as depicted. In particular, it is not intended that actual conductive material be deposited/etched to depict notes 5A, tables 5B, 5C, stackup 5D, drill information 5E and borders 5F, 5G on an actual substrate of a PCB. While the distinctions between the physical features and the auxiliary features in a given layer of a given PCB design may, in a given case, seem apparent to a downstream user who might be visually studying graphical depictions of the features, distinctions may not always be readily apparent to the downstream user. Uncertainty in the distinctions between physical features and auxiliary features may persist until such distinctions are unambiguously specified and/or encoded.

Figure 2:
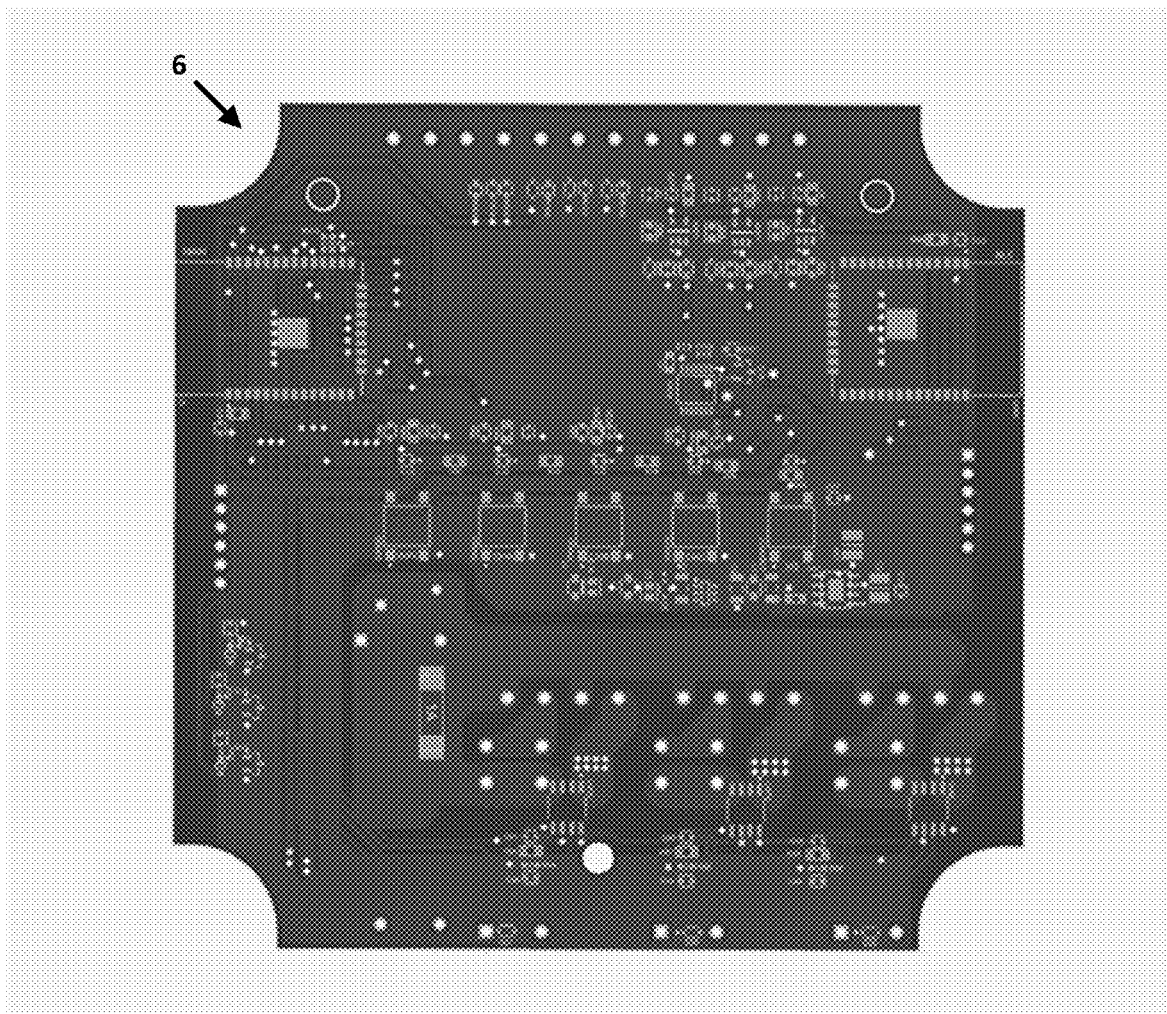
FIG. 2 is an enlarged graphical depiction of only features of the PCB design of FIG. 1 that a user may typically wish to be encompassed within the bounds of a PCB physical outline, and thus to be physically manufactured as depicted.

FIG. 2 is an enlarged graphical depiction of only features 6 of the PCB design of FIG. 1 that a user designing the PCB design may typically wish to be encompassed within the bounds of a PCB physical outline, and thus to be physically manufactured as depicted.

Figure 3:
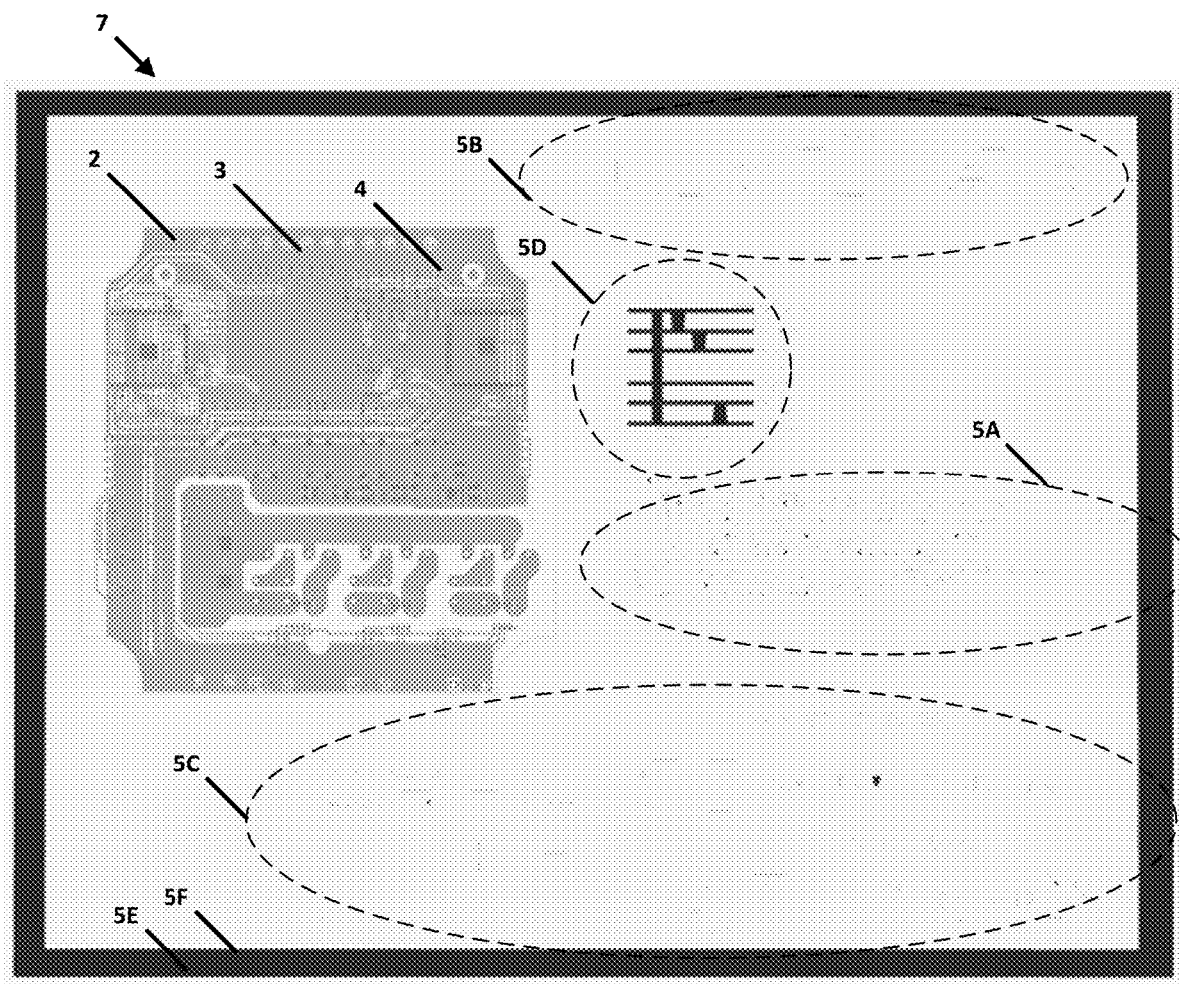
FIG. 3 is a graphical depiction of features of the PCB design of FIG. 1 that may be incorrectly encompassed within the bounds of an automatically-generated PCB physical outline, the automatically-generated PCB physical outline incorrectly also encompassing the embedded notes, stackup and drill information.

FIG. 3 is a graphical depiction of features of the PCB design of FIG. 1, some of which may be correctly encompassed within the bounds of an automatically generated PCB physical outline 7, and some of which may not correctly be encompassed within the bounds. For example, the automatically generated PCB physical outline correctly encompasses a number of physical features including conductive traces, pads, solder mask, and silkscreen features. However, the automatically generated PCB physical outline 7 incorrectly also encompasses auxiliary features representing the embedded notes 5A, tables 5B, stackup 5C, drill information 5D, and borders 5E and 5F. Because the PCB physical outline 7 incorrectly encompasses the auxiliary features, an intervention is required to produce new or modified PCB physical outline information representing a physical outline that encompasses only the physical features and excludes the auxiliary features. A downstream user may attempt such an intervention. For example, the downstream user may be required to study the PCB design and make modifications to generate one or more of: a modified conductive trace layer 2, a modified solder mask layer 3, and a modified silkscreen layer 4, from each of which any such auxiliary features representing additional information 5A-5F has been removed. Alternatively, or in some combination, the downstream user may be required to modify or generate a new outline file to define the physical outline of the physical features. In this way, the downstream user may attempt to create modified set of PCB design files that has sufficient information to enable the manufacturing machinery to manufacture a PCB that adheres more closely to the PCB design 6 shown in FIG. 2.

Figure 4:
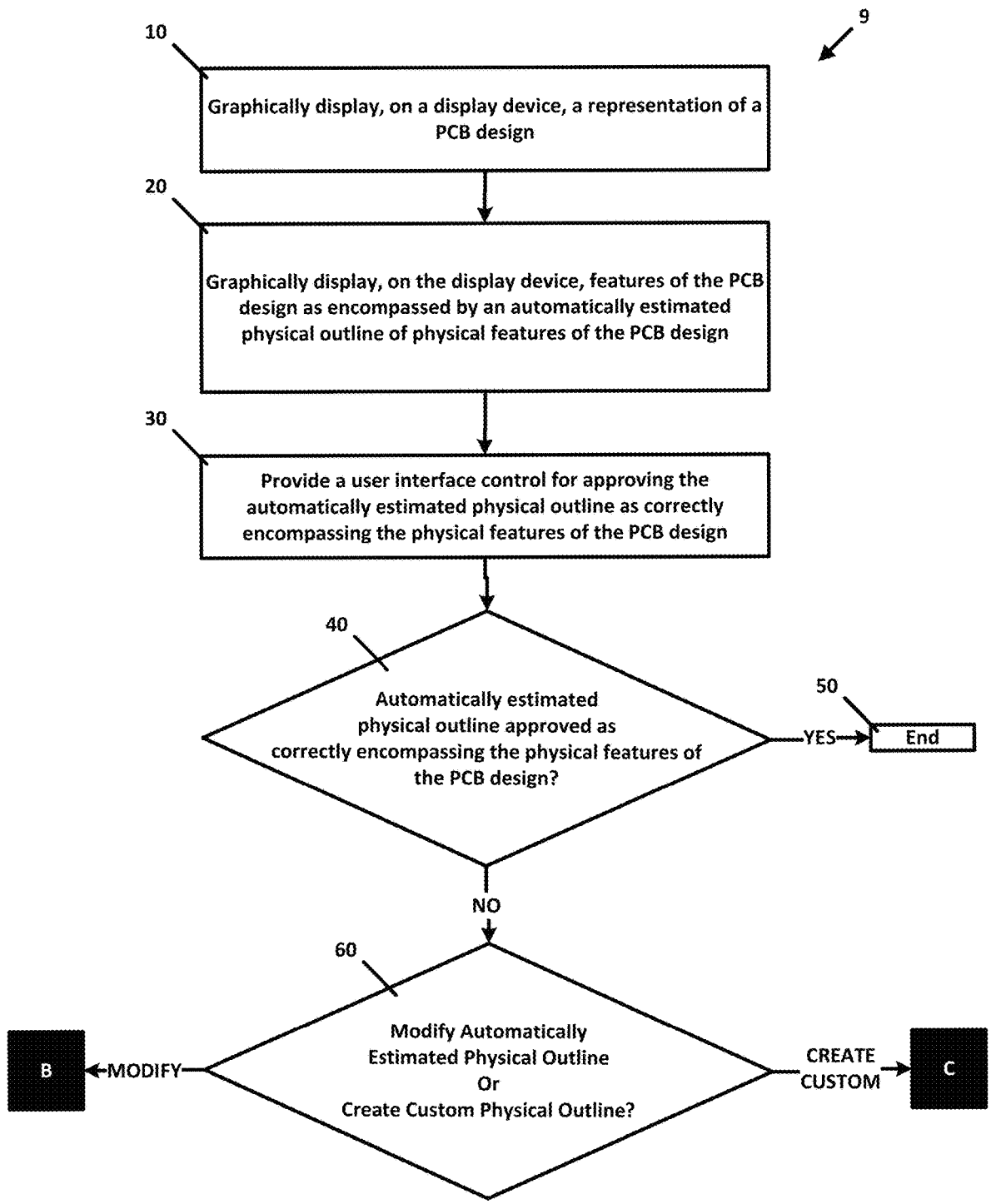
FIG. 4 is a flow diagram generally illustrating a printed circuit board (PCB) outline approval method according to the principles of the present disclosure.
Figure 4:
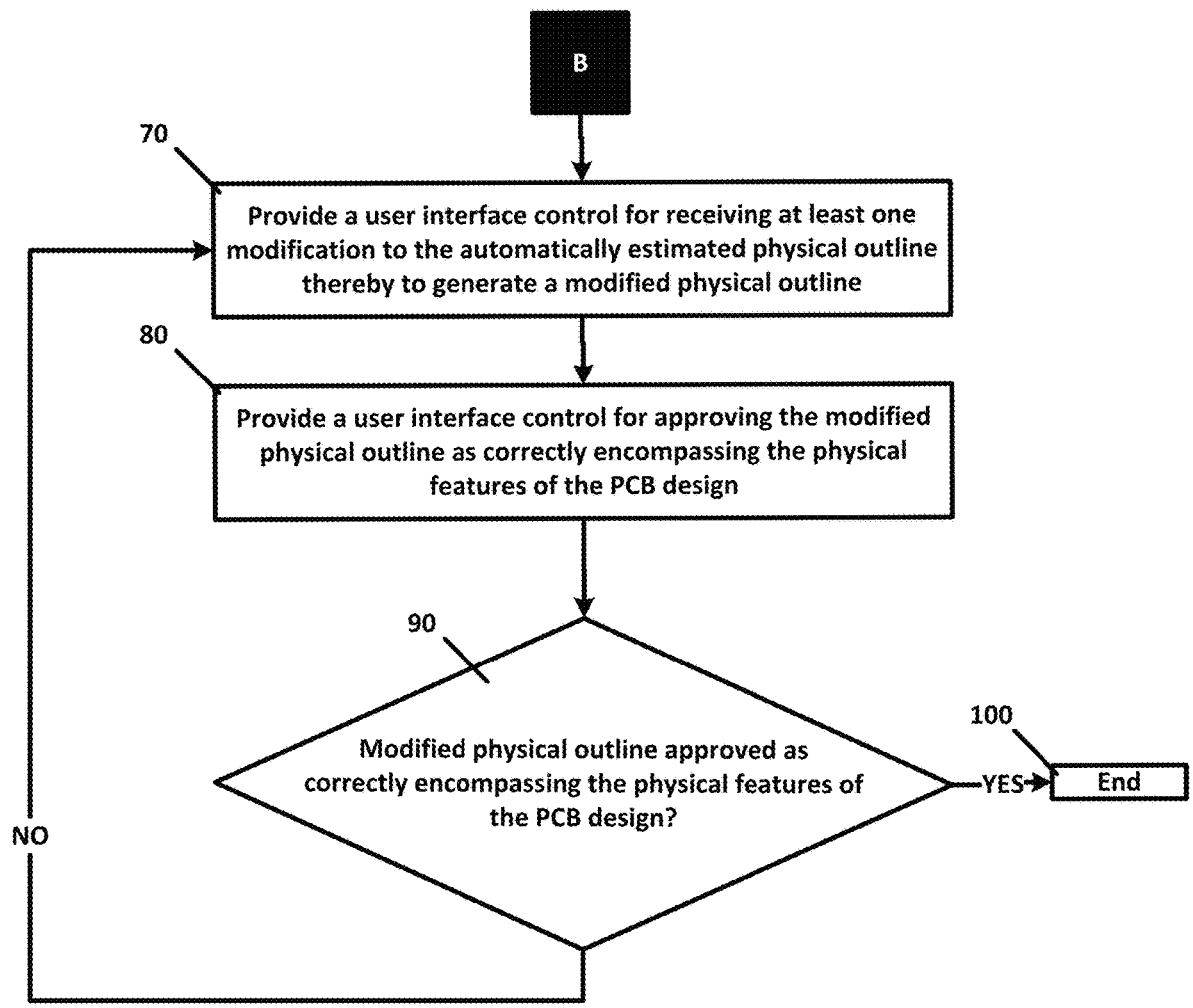
Figure 4:
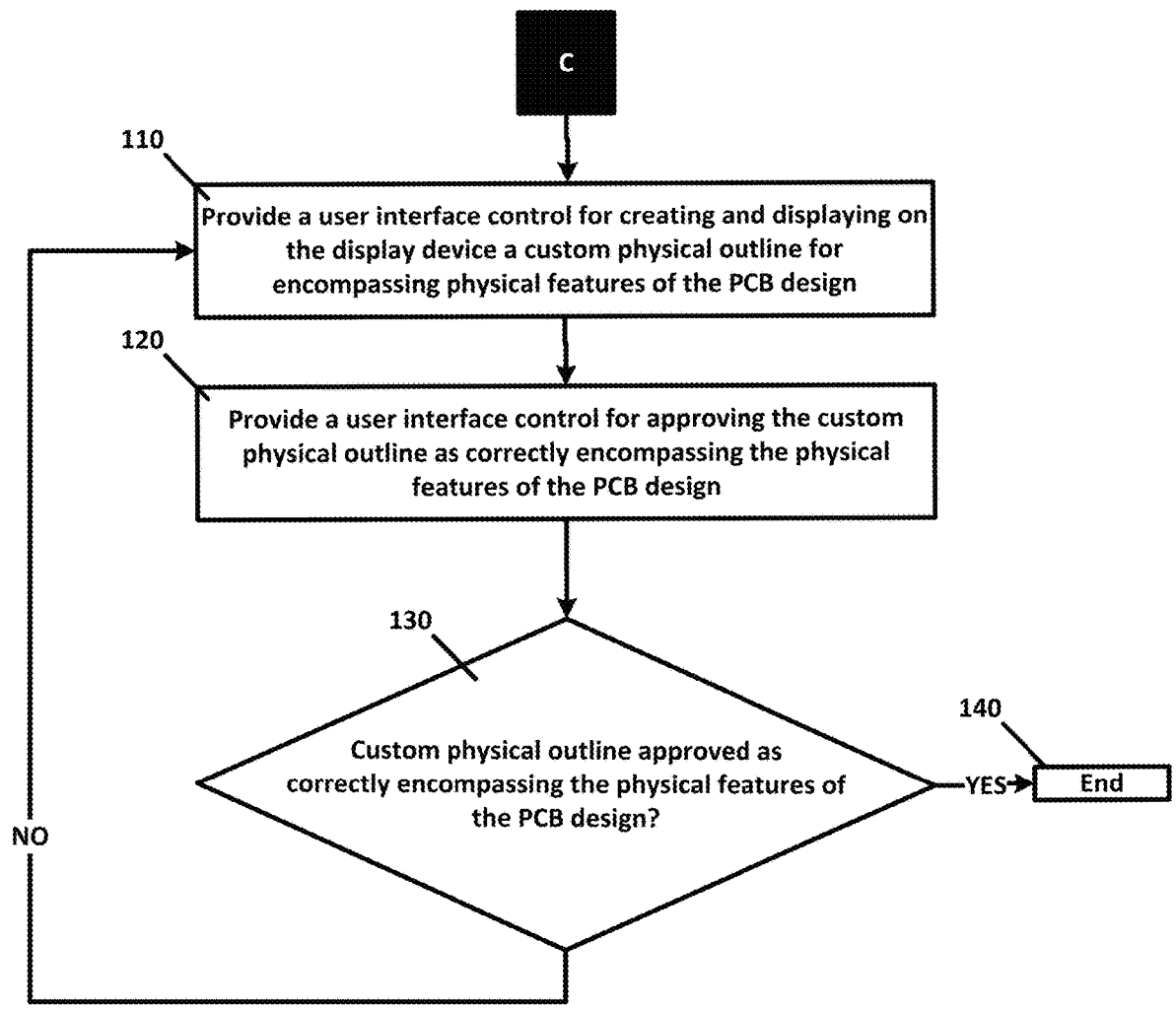

FIG. 4 is a flow diagram generally illustrating a PCB outline approval method 9 according to the principles of the present disclosure. In some embodiments, at 10, a representation of a PCB design is graphically displayed on a display device. The representation of the PCB design may be automatically generated by processing contents of one or more files constituting a PCB design. Such a file or files may be received from a user by providing a user interface for inputting the PCB design files prior to graphically displaying the representation of the PCB design. For example, a user interface screen may be provided enabling a user to upload PCB design files individually or as a set, so that a local and/or remote computing device may process the PCB design file or files to generate the representation. Such PCB design files may be Gerber design files, ODB++ design files, or PCB design files encoded according to some other schema or standard for representing layers of the PCB design.

At 20, features of the PCB design as encompassed by an automatically estimated physical outline of physical features of the PCB design are graphically displayed on the display device. Automatic estimation of the physical outline of physical features of the PCB design may be conducted at least in part by one or more computing devices using contents of one or more files constituting a PCB design, using processing techniques described herein and/or some other processing techniques. Such processing may be done by one or more computing devices physical local to the display device and/or by one or more remote computing devices in communication via a communications network with the computing device local to and/or driving the display device. In some embodiments, graphically displaying features of the PCB design as encompassed by the automatically estimated physical outline of physical features of the PCB design includes displaying only the features of the PCB design encompassed by the automatically estimated physical outline. For example, pixels representing those features not encompassed within the automatically estimated physical outline may be converted to transparent pixels and/or may filtered out prior to pixel data corresponding to layer features being provided to a display buffer of the display device. In some embodiments, graphically displaying features of the PCB design as encompassed by the automatically estimated physical outline of physical features of the PCB design includes displaying a graphical representation of the automatically estimated physical outline in association with the representation of the PCB design. For example, pixel data corresponding to the automatically estimated physical outline may be generated and overlaid on, or otherwise added to, the graphically displayed representation of the PCB design. Such pixel data corresponding to the automatically estimated physical outline may provide the user with a graphical indication of the automatically estimated physical outline itself. The user may then view which features are encompassed within the graphically displayed representation of the automatically estimated physical outline, as contrasted with those features that are not. A graphical representation of the automatically estimated physical outline may by the display of the periphery of a closed bounding box—the bounding box being of any appropriate shape and size—displayed as having a reduced transparency, or some other graphical representation. In some embodiments, graphically displaying features of the PCB design as encompassed by the automatically estimated physical outline of physical features of the PCB design includes displaying the features of the PCB design encompassed by the automatically estimated physical outline in a manner graphically distinct from features of the PCB design that are not encompassed by the estimated physical outline. A graphical distinction may be provided by displaying features encompassed within the automatically estimated physical outline in a graphically distinct colour or colours and/or a graphically distinct contrast and/or with a graphically distinct transparency, than are displayed those features not encompassed within the automatically estimated physical outline. Various combinations of graphical displays may be provided (i.e., bounding box with distinct contrasts, distinct contrasts and distinct colors, removal of non-encompassed features with bounding box, for examples), may be provided. Furthermore, a user may be provided with options for choosing between different ways of displaying the distinctions between features that are encompassed within the automatically estimated physical outline and those that are not. A user may be provided with a user interface control for toggling between different ways of displaying the distinctions and/or between displaying the distinctions and not displaying the distinctions, enabling the user to manipulate the user interface, as the user wishes, to understand the automatically estimated physical outline and its relationship to features of the PCB design.

At 30, a user interface control for approving the automatically estimated physical outline as correctly encompassing the physical features of the PCB design is provided. Such a user interface control may be a YES/NO option, a checkbox option, or some other user interface control that enables a user to register an approval or a disapproval. In some embodiments, at 40, if the automatically estimated physical outline is approved as correctly encompassing the physical features of the PCB design, with approval being indicated by user input using the user interface control indicating the user approves the automatically estimated physical outline, then the method 9 ends.

In some embodiments, with the automatically estimated physical outline having been approved by the user, an outline PCB design file encoding the estimated and approved physical outline may be automatically created. Such an outline PCB design file may be used downstream to enable a downstream user and/or downstream machinery to distinguish between physical features of the PCB design in a given layer and other features in the layer, thereby to physical manufacture only the physical features and not the other features. In this way, all features originally included in the PCB design may remain within the PCB design, but those features encompassed within the approved automatically estimated physical outline may thereafter be unambiguously regarded by a person or a machine as distinct from those features not encompassed within the approved automatically estimated physical outline.

In some embodiments, with the automatically estimated physical outline having been approved by the user, features that are not encompassed within the automatically estimated physical outline may be removed or clipped from respective PCB design files that had contained them. Such removal of features from respective PCB design files may be conducted automatically, or may be conducted with the help of user interaction. For example, in some embodiments, responsive to receiving approval from a user of the automatically estimated physical outline, features that are not encompassed within the automatically estimated physical outline may be automatically removed from respective PCB design files thereby to create modified PCB design files for respective layers. In some embodiments, features that are not encompassed within the automatically estimated physical outline may be first graphically displayed on the display device as highlighted or otherwise contrasted with the features that are encompassed within the automatically estimated physical outline that has been approved. In this way, a user may be provided with a further opportunity to contemplate any such deletions.

If, at 40, the automatically estimated physical outline is disapproved of by the user as correctly encompassing the physical features of the PCB design, with disapproval being indicated by user input using the user interface control indicating the user disapproves of the automatically estimated physical outline, then the method 9 proceeds to 60. In some embodiments, at 60, the user may be provided with a choice as to whether the user wishes to modify the estimated physical outline or wishes to create a custom physical outline. On some embodiments, the user may simply be directed to proceed with only one of these. For example, the user may be directed to modify the estimated physical outline without being given the choice of creating a new custom physical outline. As another example, the user may be directed to create a new custom physical outline without being given the choice of modifying the estimated physical outline.

In accordance with the method 9 of FIG. 4, in the event the user chooses to modify the estimated physical outline, the method 9 proceeds (via connector B) to 70. At 70, a user interface control is provided for receiving at least one modification to the automatically estimated physical outline thereby to generate a modified physical outline. In some embodiments, the user interface control may include shape controls on a graphically displayed bounding box that represents the automatically estimated physical outline, displayed atop or otherwise in connection with the graphical depiction of features of the PCB design. By using a mouse or other input device, a user may select a shape control and drag it from its original position, thereby dragging a portion of the graphically displayed bounding box. The user may modify the encompassed area of the bounding box in terms of size and/or shape as the user sees fit. In some embodiments, other user controls may be provided for modifying the bounding box. At 80, a user interface control for approving the modified physical outline as correctly encompassing the physical features of the PCB design is provided. Such a user interface control may be a YES/NO option, a checkbox option, or some other user interface control that enables a user to register an approval or a disapproval. In some embodiments, at 90, if the modified physical outline is approved as correctly encompassing the physical features of the PCB design, with approval being indicated by user input using the user interface control indicating the user approves the modified physical outline, then the method 9 ends at 100. Otherwise, the method 9 continues at 70 to enable the user to continue to modify the physical outline until the user is satisfied. A user control may be provided to enable the user to revert the modified physical outline to the automatically estimated physical outline so that the user can begin again with modifications or can alternatively just decide to approve the automatically estimated physical outline.

In accordance with the method 9 of FIG. 4, in the event the user chooses to create a custom physical outline, the method 9 proceeds (via connector C) to 110. At 110, a user interface control is provided for creating and displaying on the display device a custom physical outline for encompassing physical features of the PCB design. In some embodiments, the user interface control may include a control for drawing a graphically displayed bounding box that represents the custom physical outline, displayed atop or otherwise in connection with the graphical depiction of features of the PCB design. By using a mouse or other input device, a user may draw a bounding box and may be provided with shape controls for dragging it from its original position, thereby dragging a portion of the graphically displayed bounding box. The user may modify the encompassed area of the bounding box in terms of size and/or shape as the user sees fit. In some embodiments, other user controls may be provided for modifying the bounding box. At 120, a user interface control for approving the custom physical outline as correctly encompassing the physical features of the PCB design is provided. Such a user interface control may be a YES/NO option, a checkbox option, or some other user interface control that enables a user to register an approval or a disapproval. In some embodiments, at 130, if the custom physical outline is approved as correctly encompassing the physical features of the PCB design, with approval being indicated by user input using the user interface control indicating the user approves the custom physical outline, then the method 9 ends at 140. Otherwise, the method 9 continues at 110 to enable the user to continue to modify the custom physical outline until the user is satisfied. A user control may be provided to enable the user to revert the custom physical outline to the automatically estimated physical outline so that the user can make modifications starting from the automatically estimated physical outline or can alternatively just decide to approve the automatically estimated physical outline.

Figure 5:
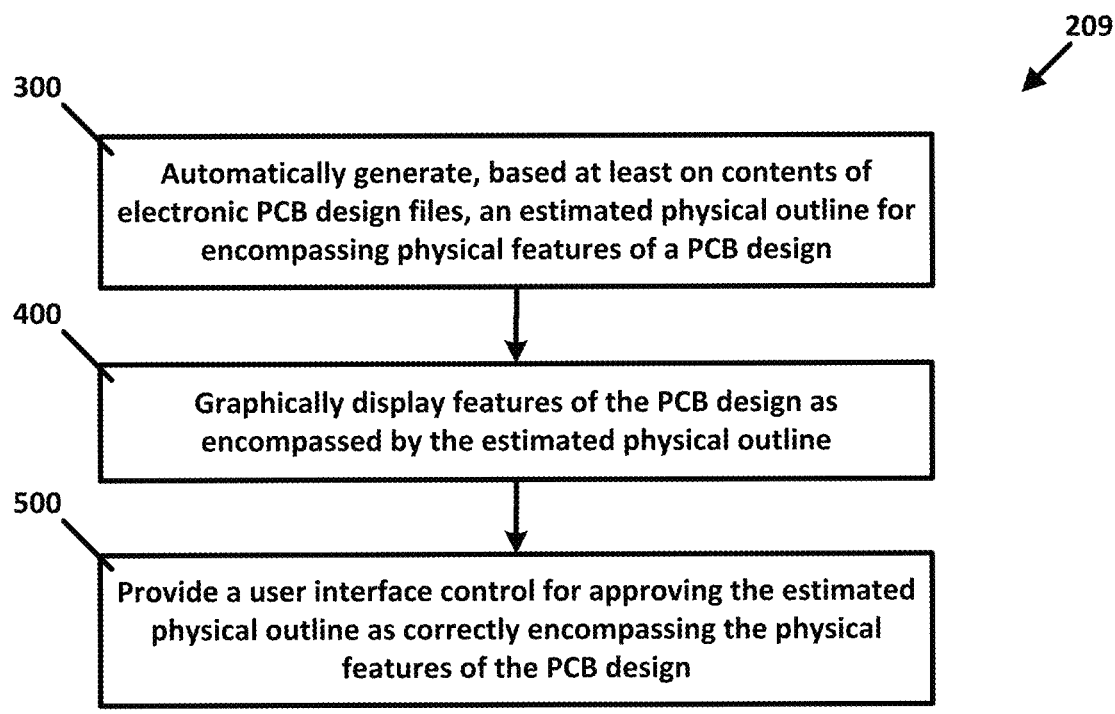
FIG. 5 is a flow diagram generally illustrating a printed circuit board (PCB) outline approval method according to the principles of the present disclosure.

FIG. 5 is a flow diagram generally illustrating a PCB outline approval method 209 according to the principles of the present disclosure. In some embodiments, at 300, an estimated physical outline for encompassing features of a PCB is automatically generated based at least on contents of electronic PCB design files, thereby to generate an automatically estimated physical outline. The automatically estimated physical outline may be automatically generated by processing contents of one or more of the files. Such a file or files may be received from a user by providing a user interface for inputting the PCB design files. For example, a user interface screen may be provided enabling a user to upload PCB design files individually or as a set, so that a local and/or remote computing device may process the PCB design file or files to estimate the physical outline. Such PCB design files may be Gerber design files, ODB++ design files, or PCB design files encoded according to some other schema or standard for representing layers of the PCB design. Automatic estimation of the physical outline of physical features of the PCB design may be conducted at least in part by one or more computing devices using contents of one or more files constituting a PCB design, using processing techniques described herein and/or some other processing techniques. Such processing may be done by one or more computing devices physical local to the display device and/or by one or more remote computing devices in communication via a communications network with the computing device local to and/or driving the display device.

At 400, features of the PCB design as encompassed by the automatically estimated physical outline are graphically displayed. In some embodiments, graphically displaying features of the PCB design as encompassed by the automatically estimated physical outline of physical features of the PCB design includes displaying only the features of the PCB design encompassed by the automatically estimated physical outline. For example, pixels representing those features not encompassed within the automatically estimated physical outline may be converted to transparent pixels and/or may filtered out prior to pixel data corresponding to layer features being provided to a display buffer of the display device. In some embodiments, graphically displaying features of the PCB design as encompassed by the automatically estimated physical outline of physical features of the PCB design includes displaying a graphical representation of the automatically estimated physical outline in association with the representation of the PCB design. For example, pixel data corresponding to the automatically estimated physical outline may be generated and overlaid on, or otherwise added to, the graphically displayed representation of the PCB design. Such pixel data corresponding to the automatically estimated physical outline may provide the user with a graphical indication of the estimated physical outline itself. The user may then view which features are encompassed within the graphically displayed representation of the automatically estimated physical outline, as contrasted with those features that are not. A graphical representation of the automatically estimated physical outline may be the display of the periphery of a closed bounding box—the bounding box being of any appropriate shape and size—displayed as having a reduced transparency, or some other graphical representation. In some embodiments, graphically displaying features of the PCB design as encompassed by the automatically estimated physical outline of physical features of the PCB design includes displaying the features of the PCB design encompassed by the automatically estimated physical outline in a manner graphically distinct from features of the PCB design that are not encompassed by the automatically estimated physical outline. A graphical distinction may be provided by displaying features encompassed within the automatically estimated physical outline in a graphically distinct colour or colours and/or a graphically distinct contrast and/or with a graphically distinct transparency, than are displayed those features not encompassed within the automatically estimated physical outline. Various combinations of graphically displays may be provided (i.e., bounding box with distinct contrasts, distinct contrasts and distinct colors, removal of non-encompassed features with bounding box, for examples), may be provided. Furthermore, a user may be provided with options for choosing between different ways of displaying the distinctions between features that are encompassed within the automatically estimated physical outline and those that are not. A user may be provided with a user interface control for toggling between different ways of displaying the distinctions and/or between displaying the distinctions and not displaying the distinctions, enabling the user to manipulate the user interface, as the user wishes, to understand the automatically estimated physical outline and its relationship to features of the PCB design.

At 500, a user interface control for approving the automatically estimated physical outline as correctly encompassing the physical features of the PCB design is provided. Such a user interface control may be a YES/NO option, a checkbox option, or some other user interface control that enables a user to register an approval or a disapproval. In some embodiments, if the automatically estimated physical outline is thereafter approved by the user, an outline PCB design file encoding the automatically estimated and approved physical outline may be automatically created. Such an outline PCB design file may be used downstream to enable a downstream user and/or downstream machinery to distinguish between physical features of the PCB design in a given layer and other features in the layer, thereby to physical manufacture only the physical features and not the other features. In this way, all features originally included in the PCB design may remain within the PCB design, but those features encompassed within the approved automatically estimated physical outline may thereafter be unambiguously regarded by a person or a machine as distinct from those features not encompassed within the approved automatically estimated physical outline.

In some embodiments, with the automatically estimated physical outline having been approved by the user, an outline PCB design file encoding the estimated and approved physical outline may be automatically created. Such an outline PCB design file may be used downstream to enable a downstream user and/or downstream machinery to distinguish between physical features of the PCB design in a given layer and other features in the layer, thereby to physical manufacture only the physical features and not the other features. In this way, all features originally included in the PCB design may remain within the PCB design, but those features encompassed within the approved automatically estimated physical outline may thereafter be unambiguously regarded by a person or a machine as distinct from those features not encompassed within the approved automatically estimated physical outline.

In some embodiments, with the automatically estimated physical outline having been approved by the user, features that are not encompassed within the estimated physical outline may be removed from respective PCB design files that had contained them. Such removal of features from respective PCB design files may be conducted automatically, or may be conducted with the help of user interaction. For example, in some embodiments, responsive to receiving approval from a user of the automatically estimated physical outline, features that are not encompassed within the automatically estimated physical outline may be automatically removed from respective PCB design files thereby to create modified PCB design files for respective layers. In some embodiments, features that are not encompassed within the automatically estimated physical outline may be first graphically displayed on the display device as highlighted or otherwise contrasted with the features that are encompassed within the automatically estimated physical outline that has been approved. In this way, a user may be provided with a further opportunity to contemplate any such deletions.

If the automatically estimated physical outline is thereafter disapproved of, a user interface may be provided for enabling the user to modify the automatically estimated physical outline or create a custom physical outline, or to take some other action such as to upload different PCB design files, as described herein.

Figure 6:
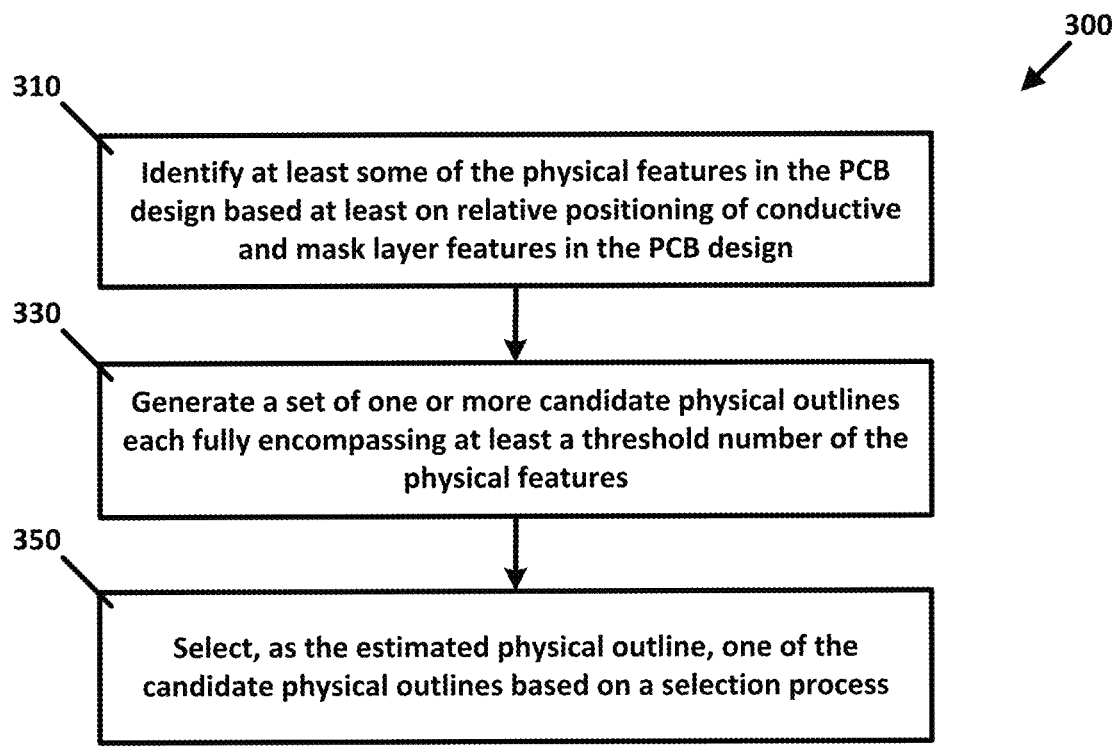
FIG. 6 is a flow diagram generally illustrating steps in an embodiment of the automatic generating in FIG. 5.

FIG. 6 is a flow diagram generally illustrating steps in an embodiment of the automatic generating at 300 in FIG. 5. In some embodiments, at 310, at least some of the physical features in the PCB design are identified based at least on relative positioning of conductive and mask layer features in the PCB design. Conductive layer features may, for example, be encoded within a PCB design file designated for conductive material as draw/erase commands for the conductive material. Mask layer features may, for example, be encoded within another PCB design file designated for mask material (or designated for patterns of exclusions that should be formed in the mask material) as draw/erase commands for the mask material (or for the patterns of exclusions that should be formed in the mask material). At 330, one or more candidate physical outlines each fully encompassing at least a threshold number of the physical features are generated.

In some embodiments, generating the one or more candidate physical outlines includes, if the PCB design files includes an outline file, including as candidates any physical outlines in the outline file that fully encompass the threshold number of the physical features. It will be appreciated that an outline file may itself contain auxiliary features that could be erroneously interpreted as physical outlines, such that not all such physical outlines, but only those that fully encompass the threshold number of the physical features should be treated as candidates. Otherwise, if no outline file is provided, the selection process may include processing all non-internal and non-drill layer PCB design files to determine if such layers include any physical outlines that would fully encompass the threshold number of the physical features, and including as candidates any of such physical outlines.

At 350, the estimated physical outline is selected as one of the candidate physical outlines based on a selection process. In some embodiments, the selection process includes selecting from only the candidate physical outlines in the set that encompass at least a threshold area. Candidate physical outlines that are too small to be the size of the board are thus filtered out. In some embodiments, the selection process includes selecting from only the candidate physical outlines in the set having at least a threshold excavation area. Candidate physical outlines with respective excavations that are too small to encompass the size of the board are thus filtered out.

In some embodiments, the selection process includes filtering out one or more candidate outlines encompassing less than a threshold amount of the physical features. For example, a threshold amount of physical features may be 90%, such that candidate physical outlines must encompass at least 90% of the physical features. Other thresholds may be selected for a given implementation. For example, the selection process may include sorting the one or more candidate physical outlines by size of area. The selection process may also include selecting as the estimated physical outline the largest of the candidate physical outlines having an area that is less than a threshold amount greater than that of the smallest of the candidate physical outlines. In some embodiments, a bounding box may be generated to encompass the physical features that are determined as described herein. Those candidate physical outlines that are greater in dimension in any direction than the bounding box by more than a threshold amount may be filtered out of the candidate physical outlines. In some embodiments, the threshold amount may be 50%. Other threshold amounts may be selected for a given implementation.

In some embodiments, determination of an estimated physical outline from a set of candidate physical outlines may be associated with a confidence level. For example, if there are multiple candidates, even after the filtering and thresholding described herein, that would suffice such that the confidence level for any one of them is not a threshold amount higher than any others, the user may be prompted to choose and provided with a user interface control for selecting which of the multiple sufficient candidates should be regarded as the approved estimated physical outline.

Figure 7:
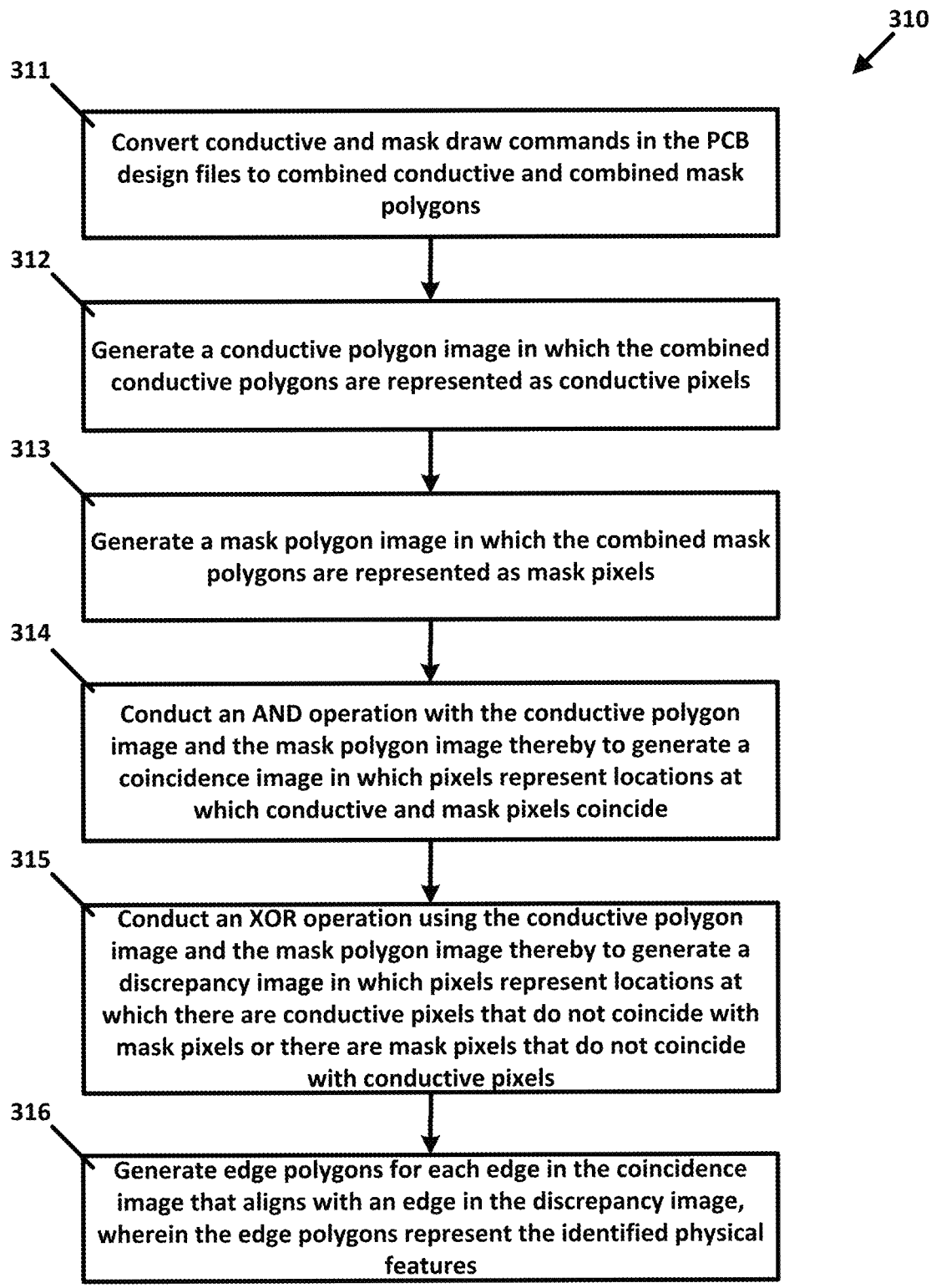
FIG. 7 is a flow diagram generally illustrating steps in an embodiment of the identifying in FIG. 6.

FIG. 7 is a flow diagram generally illustrating steps in an embodiment of the identifying of physical features at 310 in FIG. 6. At 311, conductive and mask draw commands in the PCB design files are respectively converted to combined conductive polygons, and to combined mask polygons.

In some embodiments, converting conductive and mask draw commands in the PCB design files to respective conductive and mask polygons includes converting each of the conductive draw/erase commands into individual conductive polygons, and converting mask draw commands into individual mask polygons. For example, conductive draw commands in a conductive layer PCB design file may be processed to generate conductive polygons each defined in terms of multiple vertices in a coordinate system for the PCB design. Similarly, mask draw commands in a mask layer PCB design file may be processed to generate mask polygons each defined in terms of multiple vertices in the coordinate system. For example, Gerber files may generally include, on each line, a draw or erase command that specifies a stencil or shape (a draw tool change), a polarity change (erase vs. draw) and a command to run the specified draw tool at a particular coordinate. The draw/erase commands for each of the PCB design files representing the conductive and mask layers are converted to represent the commands as individual polygons.

In some embodiments, the individual conductive polygons are combined to form the combined conductive polygons located at respective locations, and the individual mask polygons are combined to form the combined mask polygons located at respective locations. The combining of individual polygons into a reduced number of combined polygons may be conducted using a computational technique. For example, a sweep line algorithm may be used to create combined polygons by processing individual polygons that, based on their shape, size and locations, are coincident or intersecting. Furthermore, each of the combined polygons may be associated with a list of hole polygons that are encompassed within them. For example, a particular group of draw commands for a conductive layer may be combined to define one or more combined "draw" polygons, and a particular group of erase commands for the conductive layer may be combined to define one or more "erase" polygons. An erase polygon that is sized, shaped and positioned to be encompassed within a particular draw polygon is associated with the draw polygon as a hole within the draw polygon.

Some PCB design file formats, such as Gerber, may permit the definition of draw/erase commands on top of older/previous draw/erase commands. A number of such draw/erase commands may therefore be stacked in respect of a particular physical location. In some embodiments, draw/erase commands are therefore grouped programmatically into composite levels, the sweep line algorithm is run over each composite level thereby to draw on top of a previous composite level result. That is, for all composite groups, a composite result is equal to the combination of the result (if not null), plus all composite polygons and holes at a current iteration.

In some embodiments, individual mask polygons and individual conductive polygons may be processed differently prior to combination.

At 312, a conductive polygon image in which the combined conductive polygons are represented as conductive pixels is generated. For example, pixels in the conductive polygon image at positions corresponding to those of the combined conductive polygons may be set to black, with all others set to white. Other pixel representations distinguishing in the conductive polygon image between that which is a conductive polygon, and that which is not, may be provided. Similarly, at 313, a mask polygon image in which the combined mask polygons are represented as mask pixels is generated. For example, pixels in the mask polygon image at positions corresponding to those of the combined mask polygons may be set to black, with all others set to white. Other pixel representations distinguishing in the mask polygon image between that which is a mask polygon, and that which is not, may be provided, such as other distinct colours or pixel values in general. Furthermore, for clarity, in some embodiments the mask polygon image may have (for example) black pixels corresponding to locations at which a coating for the PCB is not to be present, as opposed to black pixels at locations at which a coating for the PCB is to be present. It will be appreciated that it may be intended that a coating be applied to the entirety of a PCB with the exception of particular locations corresponding, for example, to conductive pads that need to be accessed during assembly thereby to connect electronic components to the conductive pads. The mask polygons may therefore generally represent these particular "no-coating" locations, rather than "coating" locations.

At 314, an AND operation is conducted with the conductive polygon image and the mask polygon image thereby to generate a coincidence image in which active pixels represent locations at which conductive and mask pixels coincide. In embodiments, the conductive polygon image has the same number of pixels and dimensions as the mask polygon image. During the AND operation, each pixel in the conductive polygon image is compared with its counterpart pixel at the same location in the mask polygon image to determine whether both have the same value. For example, with the mask polygon image having, for example, black pixels at "no-coating" locations, and the conductive polygon image having black pixels at locations at which there is to be conductive material, after the AND operation the coincidence image will have black pixels at locations at which both the conductive polygon image and the mask polygon image have black pixels. The coincidence image will have white pixels at all other locations.

At 315, an XOR operation is conducted with the conductive polygon image and the mask polygon image thereby to generate a discrepancy image in which active pixels represent locations at which there are discrepancies between conductive and mask pixels in their respective polygon images. During the XOR operation, each pixel in the conductive polygon image is compared with its counterpart pixel at the same location in the mask polygon image to determine whether they have different values. For example, with the mask polygon image having, for example, black pixels at "no-coating" locations, and the conductive polygon image having black pixels at locations at which there is to be conductive material, after the XOR operation the discrepancy image will have black pixels at locations at which there are black conductive pixels and white mask pixels (conductive=black and mask=white), and will also have black pixels at locations at which there are black mask pixels but and white conductive pixels (conductive=white and mask=black). The discrepancy image will have white pixels at all other locations.

At 316, edge polygons are generated for each edge in the coincidence image that aligns with an edge in the discrepancy image, and the edge polygons are deemed to represent the identified physical features. In some embodiments, during generating of the edge polygons, algorithmically the black pixels in the coincidence image may be converted to red pixels, and the black pixels in the discrepancy image may be converted to blue pixels. An edge alignment detection process may detect red edges in the coincidence image that aligns with blue edges in the discrepancy image, and may convert the pixels of such red and blue aligning edges to purple pixels. An edge image may then be created to contain only the purple pixels, and thus only the aligned edges, with the remaining pixels in the edge image being white. It will be appreciated that other techniques for determining and delineating aligning edges may be conducted, with the purple or otherwise aligned-edge pixels in the edge image being likely to represent the physical features of the PCB.

Figure 8:
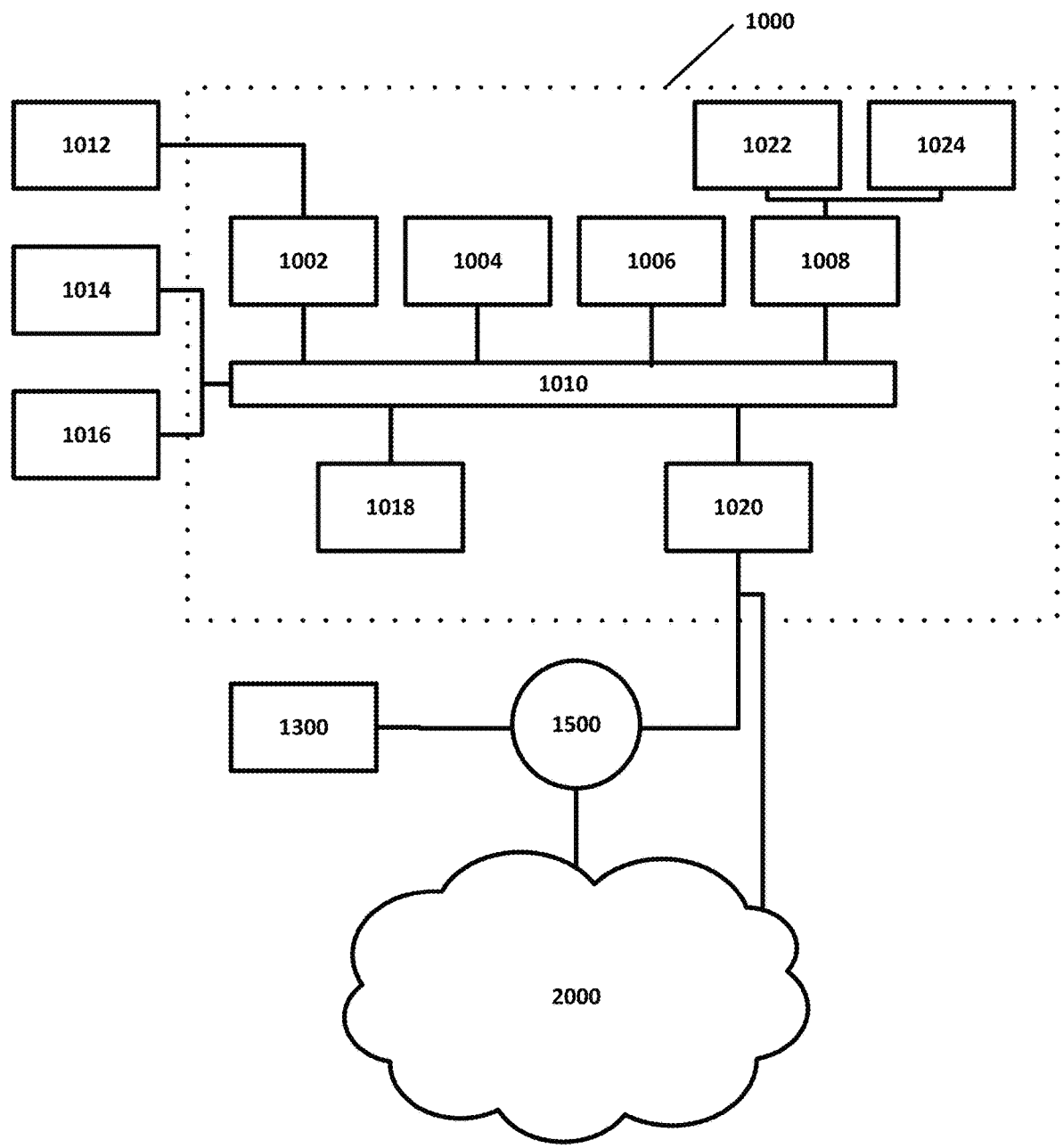
FIG. 8 is a schematic diagram showing a hardware architecture of a computing system 1000 configurable to implement aspects of the PCB outline approval method, in some embodiments.

FIG. 8 is a schematic diagram showing a hardware architecture of a computing system 1000 configurable to implement aspects of the PCB outline approval method, in some embodiments. Computing system 1000 is suitable as the hardware platform for a computing device configured to implement aspects of the PCB outline approval method, in some embodiments. In some embodiments, such a computing device may be a server with which a user on a remote computing device interacts via a web browser or other application software to carry out the steps described herein. In some embodiments, such a computing device may be the computing device with which a user interacts locally via a web browser or other application software to carry out the steps described herein.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display device (or, "display") 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 may include input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry, such as an Application Specific Integrated Circuit (ASIC), may be used in place of or in combination with software instructions.

As stated above, computing system 1000 includes at least one processor readable medium or memory for holding instructions programmed according to the teachings of the description and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user. Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Figure 9:
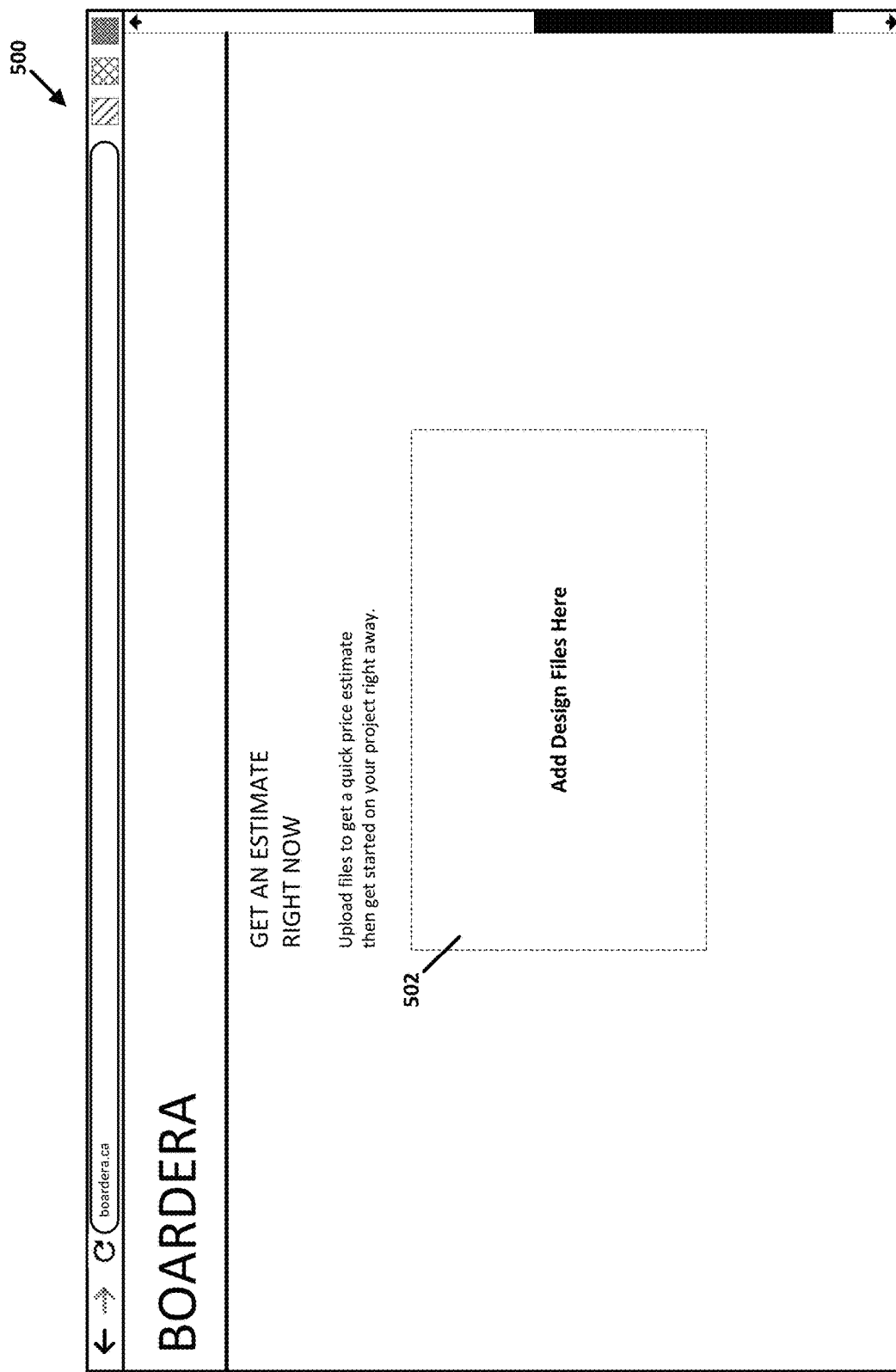
FIG. 9 is a user interface provided on a display device for allowing input into a computing system of PCB design files for processing to automatically generate a PCB and/or PCBA cost estimate and an estimated PCB physical outline.
Figure 10:
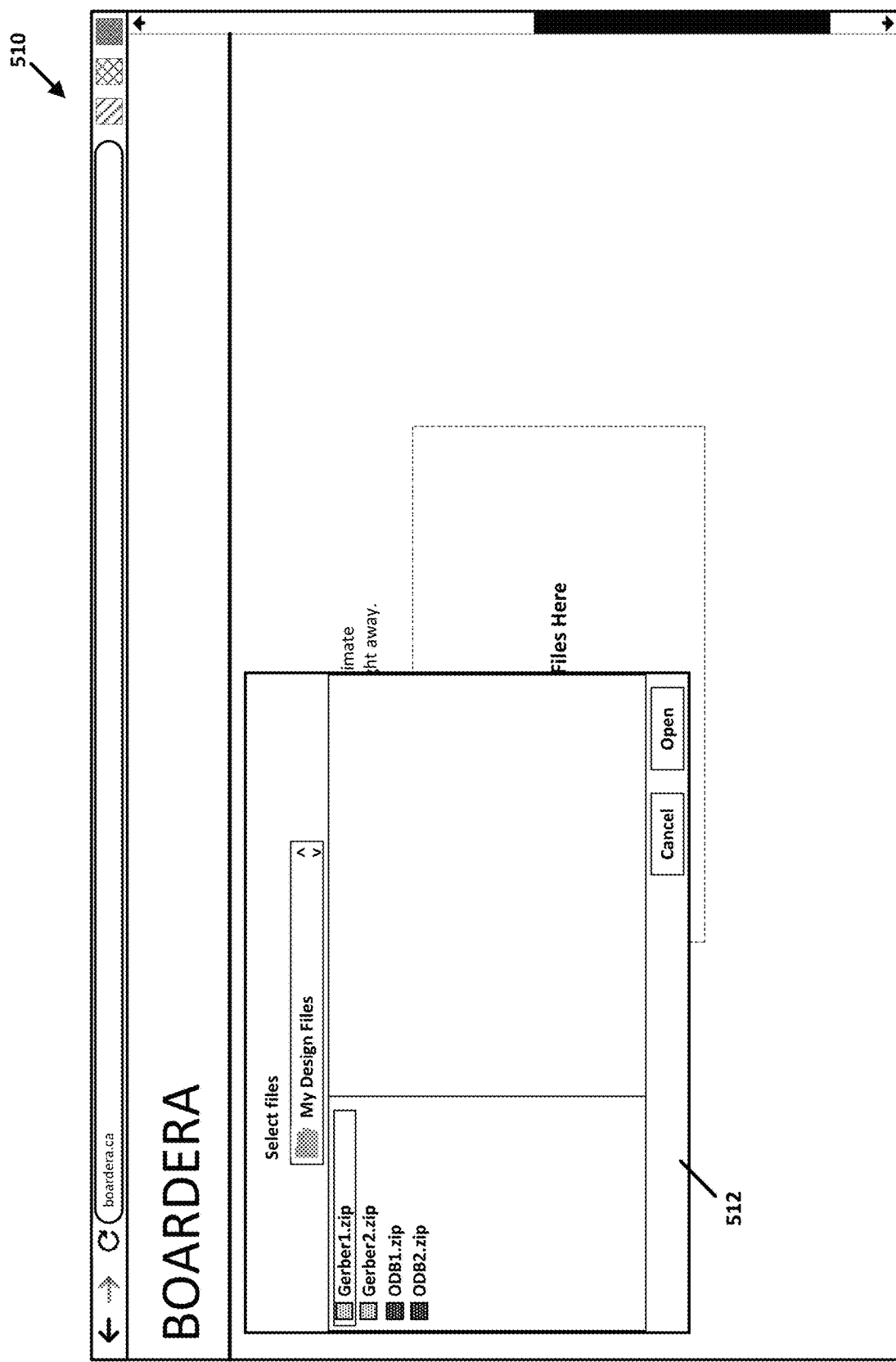
FIG. 10 is a user interface provided on the display device for selecting PCB design files for input into the computing system, according to some embodiments.

FIG. 9 is a user interface 500 provided on a display device such as display device 1012, for allowing input into a computing system of PCB design files for processing to automatically generate a PCB and/or PCBA cost estimate and an estimated PCB physical outline, as described herein. User interface 500 is presented using a web browser application, such as a Google Chrome, Apple Safari, Mozilla Firefox or another web browser application. User interface 500 includes an upload UI control 502 for enabling a user to add one or more PCB design files or a set of PCB design files by dragging a selected file or files from a folder using the UI of the computing system into UI control 502. In this embodiment, upload UI control 502 permits a user to alternatively select UI control 502 using a mouse or other input device to generate a dialog box for selecting a file or files, as shown in FIG. 10. FIG. 10 is a user interface 510 provided on the display device for selecting one or more PCB design files from a dialog box 512 for input into the computing system, according to some embodiments. A user may select from a number of listed files, such as "Gerber1.zip" shown highlighted in FIG. 10, and press "Open" to cause the selected file or files to be input into the computing system.

Figure 11:
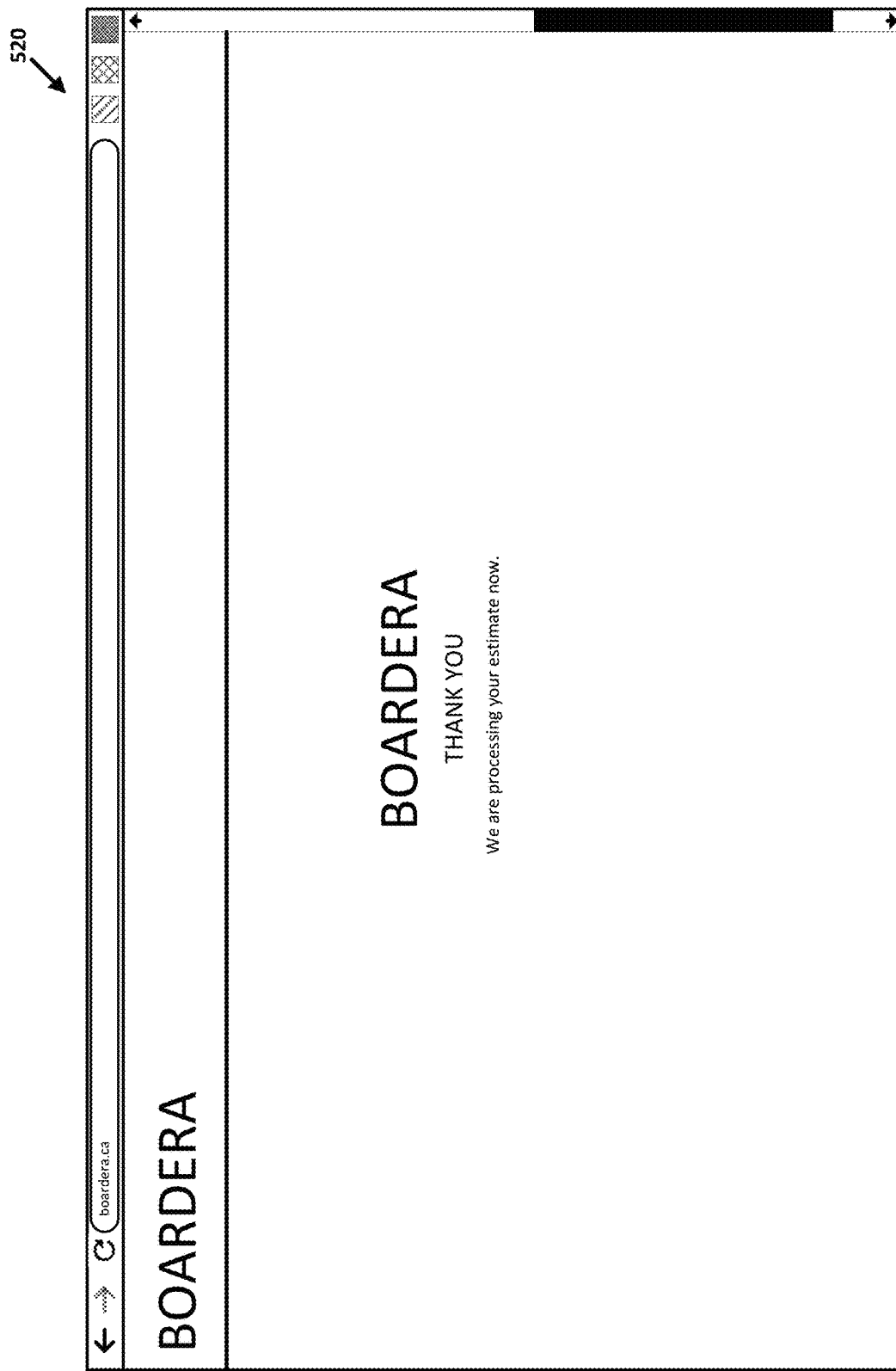
FIG. 11 is a user interface provided on the display device for confirming selected PCB design files are being processed for automatically generating the cost estimate, according to some embodiments.

FIG. 11 is a user interface 520 provided on the display device for confirming selected PCB design files are being processed for automatically generating the cost estimate, according to some embodiments.

Figure 12:
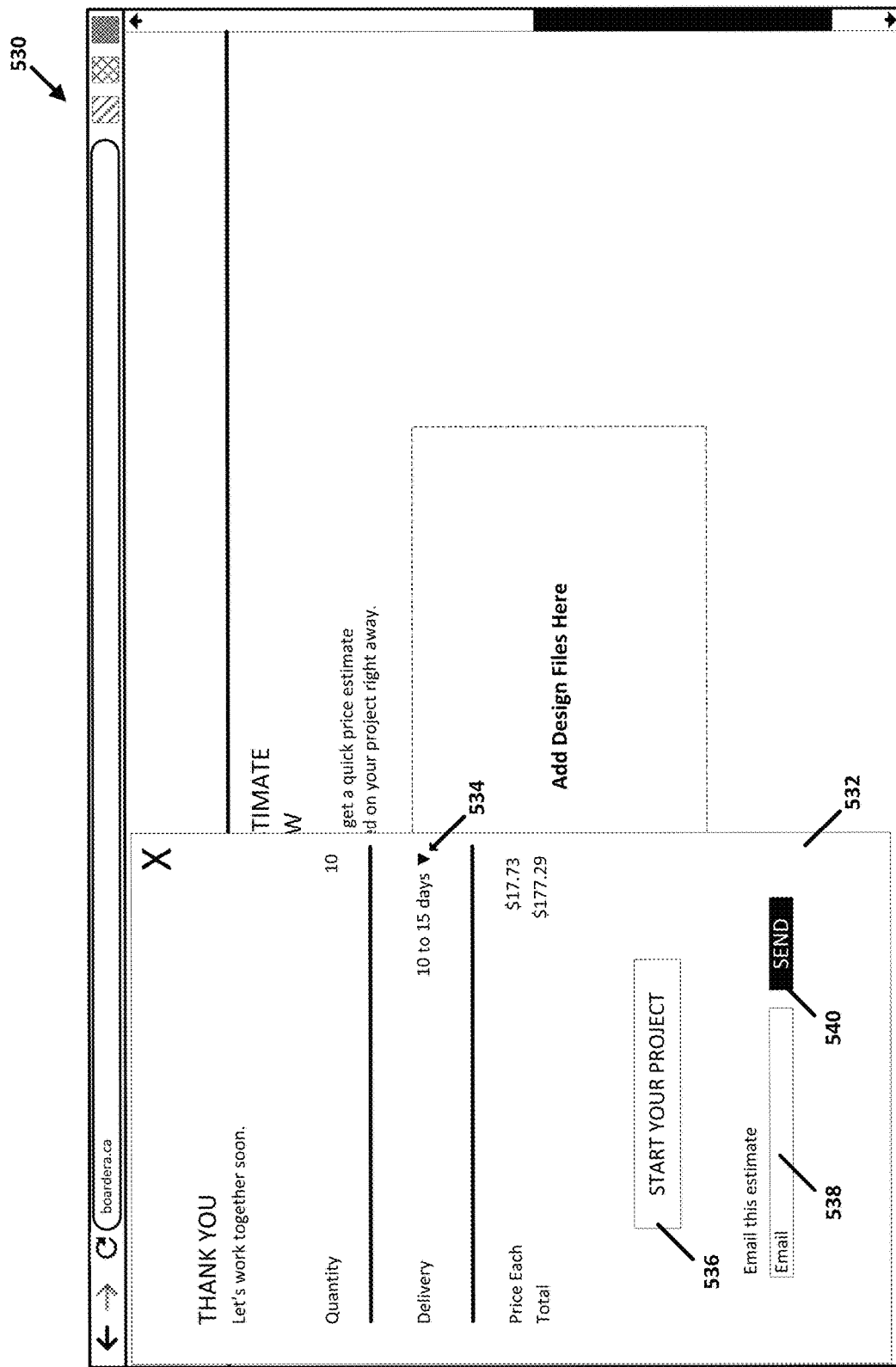
FIG. 12 is a user interface provided on the display device for displaying the automatically-generated cost estimate, according to some embodiments.

FIG. 12 is a user interface 540 provided on the display device for displaying the automatically generated cost estimate, according to some embodiments. Processes for automatically generating cost estimates using PCB design files are not within the scope of this application. However, generally features encoded in PCB design files, BOMs, drill files and the like are processed to determine the number and nature of the features, including sizes and complexities of features, and the components themselves including required assembly processes, in order to calculate pricing based on the processing and based on pricing made available for production by a manufacturer of the PCB and/or PCBA. User interface 540 includes an overlay 532 for providing pricing feedback including a number of units, a delivery time estimate, a price per PCB/PCBA, and a total price calculated based on the price per PCB/PCBA and the number of units. Overlay 532 includes a user interface control 534 for enabling a user to change the delivery time estimate, with a shorter time estimate generally resulting in a calculation of a higher price and a longer time estimate generally resulting in a calculation of a lower price. Overlay 532 also includes a Start Your Project button 536 for enabling a user to move from the cost estimate user interface 540 to a project user interface, as will be described. Overlay 532 also includes an Email this estimate text box 538 with corresponding send button 540 enabling a user to receive an email copy of the estimate set out in the overlay 532.

Figure 13:
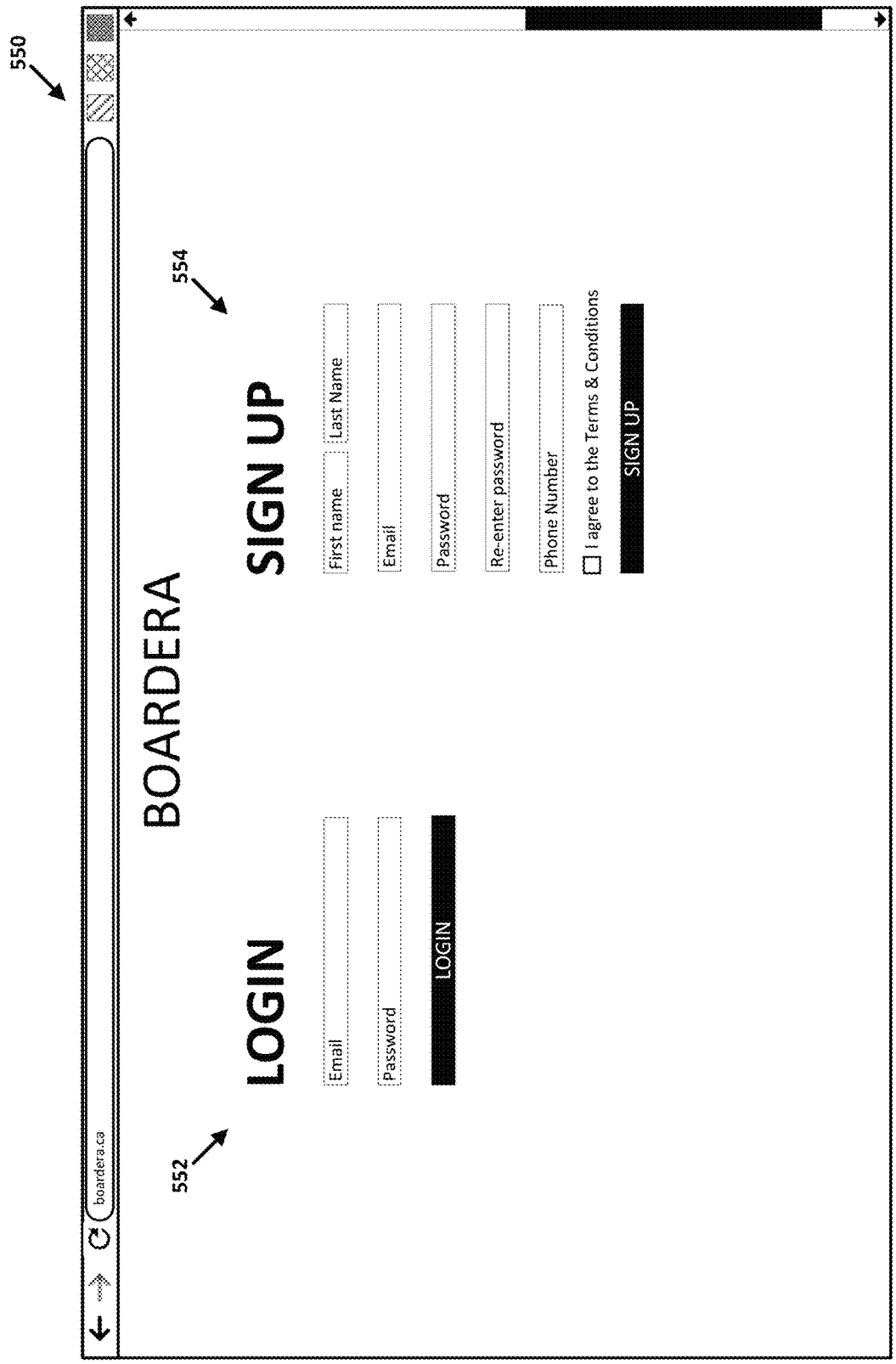
FIG. 13 is a user interface provided on the display device for enabling a user to login or register to proceed with a project based on the inputted PCB design files, according to some embodiments.

FIG. 13 is a user interface 550 provided on the display device for enabling a user to login or register to proceed with a project based on the inputted PCB design files, according to some embodiments. User interface 550 includes a LOGIN section 552 enabling a user to submit the user's email address and password thereby to log in. User interface also includes a SIGN UP section 554 enabling a user to enter the user's first and last names, their email address, password, and phone number. SIGN UP section also includes a checkbox for enabling the user to agree to software Terms & Conditions, thereby to sign in. After signing in, the user may log in using the user's email address and chosen password.

Figure 14:
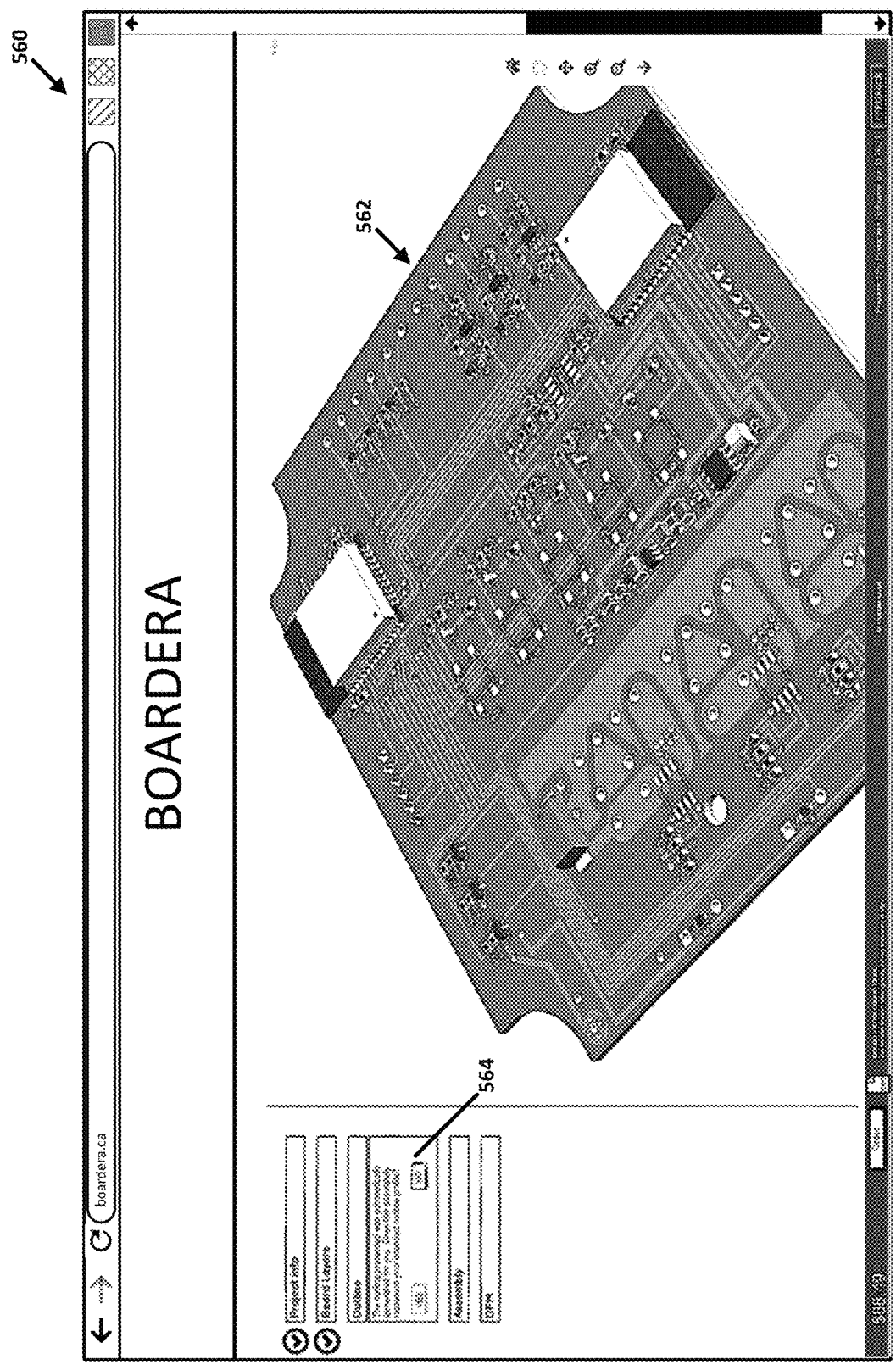
FIG. 14 is a user interface provided on the display device for graphically displaying an automatically-generated representation of the PCB design and for graphically displaying features of the PCB design as encompassed by an estimated PCB physical outline of the PCB design, including a user interface control for approving the estimated PCB physical outline as correctly encompassing the physical features of the PCB design, according to some embodiments.

FIG. 14 is a user interface 560 provided on the display device for graphically displaying an automatically generated representation 562 of the PCB design and for graphically displaying features of the PCB design as encompassed by an estimated PCB physical outline of the PCB design. A user may be led through various stages to specify Project Information, Board Layers, the physical Outline, Assembly Information, and DFM (Design For Manufacturing) test results that may provide information to the user about manufacturability of the PCB design based on capabilities of manufacturing equipment and/or facilities. As shown in FIG. 14, the user has reached the Outline stage, and features of the PCB design as encompassed by an automatically estimated physical outline of the physical features of the PCB design are being graphically displayed. The physical outline of the physical features of the PCB design may be automatically estimated using automatic estimation processes as described herein. In this embodiment, just those features encompassed within the automatically estimated physical outline are being displayed, whereas any auxiliary features—those features outside of the estimated physical outline—are not being displayed in user interface 560.

User interface 560 includes a user interface control 564 for enabling a user to signal approval of the automatically estimated PCB physical outline as correctly encompassing the physical features of the PCB design, according to some embodiments. A user may select a YES button to signal approval. Responsive to the user selecting the YES button, the automatically estimated physical outline is deemed approved, and in some embodiments a new or modified outline file may be created for the set of PCB design files that unambiguously specifies the approved automatically estimated physical outline. In some embodiments, features not encompassed within the approved automatically estimated physical outline may be automatically removed from respective PCB design files thereby to generate modified PCB design files, or may be removed with subsequent user confirmation. Variations are possible.

User interface control 564 also enables a user to signal disapproval of the estimated physical outline. A user may select a NO button to signal disapproval. Responsive to the user selecting the NO button, a user may be provided with a user interface for creating a custom physical outline or for modifying the automatically estimated physical outline, as described herein.

Figure 15:
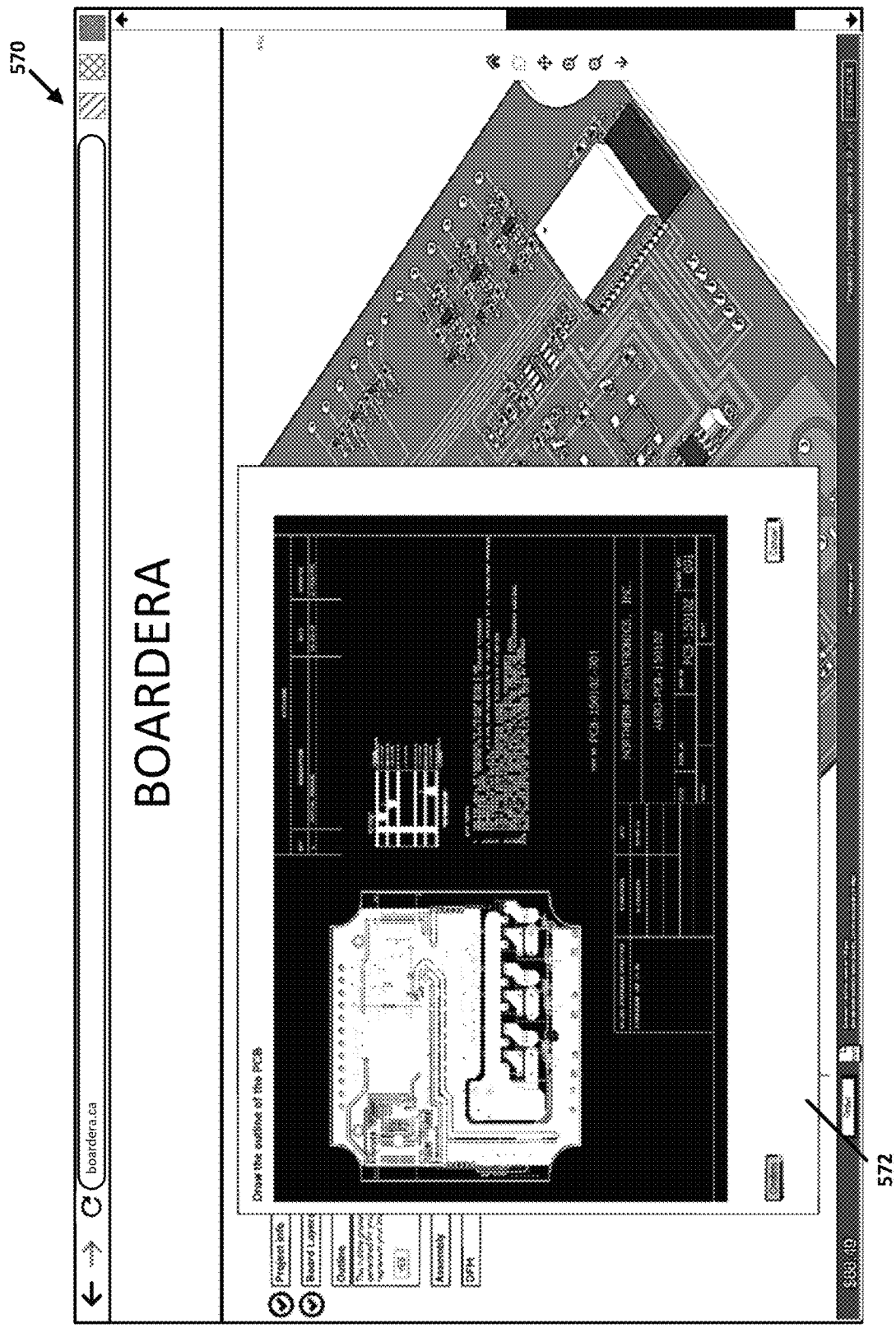
FIG. 15 is a user interface control provided on the display device for creating and displaying on the display device a custom PCB physical outline for encompassing physical features of the PCB design.

FIG. 15 is a user interface 570 provided on the display device including a user interface control 572 for creating and displaying on the display device a custom PCB physical outline for encompassing physical features of the PCB design. A user may be brought to user interface 570 after having selected NO in user interface control 564 as shown in FIG. 14. In this embodiment, in FIG. 15, user interface control 572 provides a graphical depiction of the PCB design 1, and instructs the user to draw a physical outline of the PCB, thereby to create the custom PCB physical outline. Using a mouse or other input device, the user may position a cursor on user interface control 572, select draw and drag the cursor to create a closed shape that encompasses that which is presented in the physical representation that the user feels is the PCB physical outline. The coordinates of the drawing by the user are tracked and recorded by the user interface control 572 thereby to record the shape and size of the drawing. It will be appreciated that the graphical depiction of the particular PCB design shown in FIG. 15 is similar to that shown in FIG. 1, such that it also includes auxiliary features that the user may wish to exclude from the interior of the closed shape the user is drawing, thereby to effectively exclude such auxiliary features from being considered physical features. Once the user has completed drawing his or her custom PCB outline, the user may approve of the custom PCB outline by selecting a CONFIRM button. Responsive to the user selecting the CONFIRM button, the custom physical outline is deemed approved, and in some embodiments a new or modified outline file may be created for the set of PCB design files that unambiguously specifies the approved custom physical outline. In some embodiments, features not encompassed within the approved custom physical outline may be automatically removed from respective PCB design files thereby to generate modified PCB design files, or may be removed with subsequent user confirmation. Variations are possible.

User interface control 572 also enables a user to signal disapproval of the custom physical outline. A user may select a CANCEL button to signal disapproval. Responsive to the user selecting the CANCEL button, a user may be provided with a user interface for creating a new custom physical outline, reverting to review of and/or modification of the automatically estimated physical outline, or some other user interface, as described herein.

Figure 16:
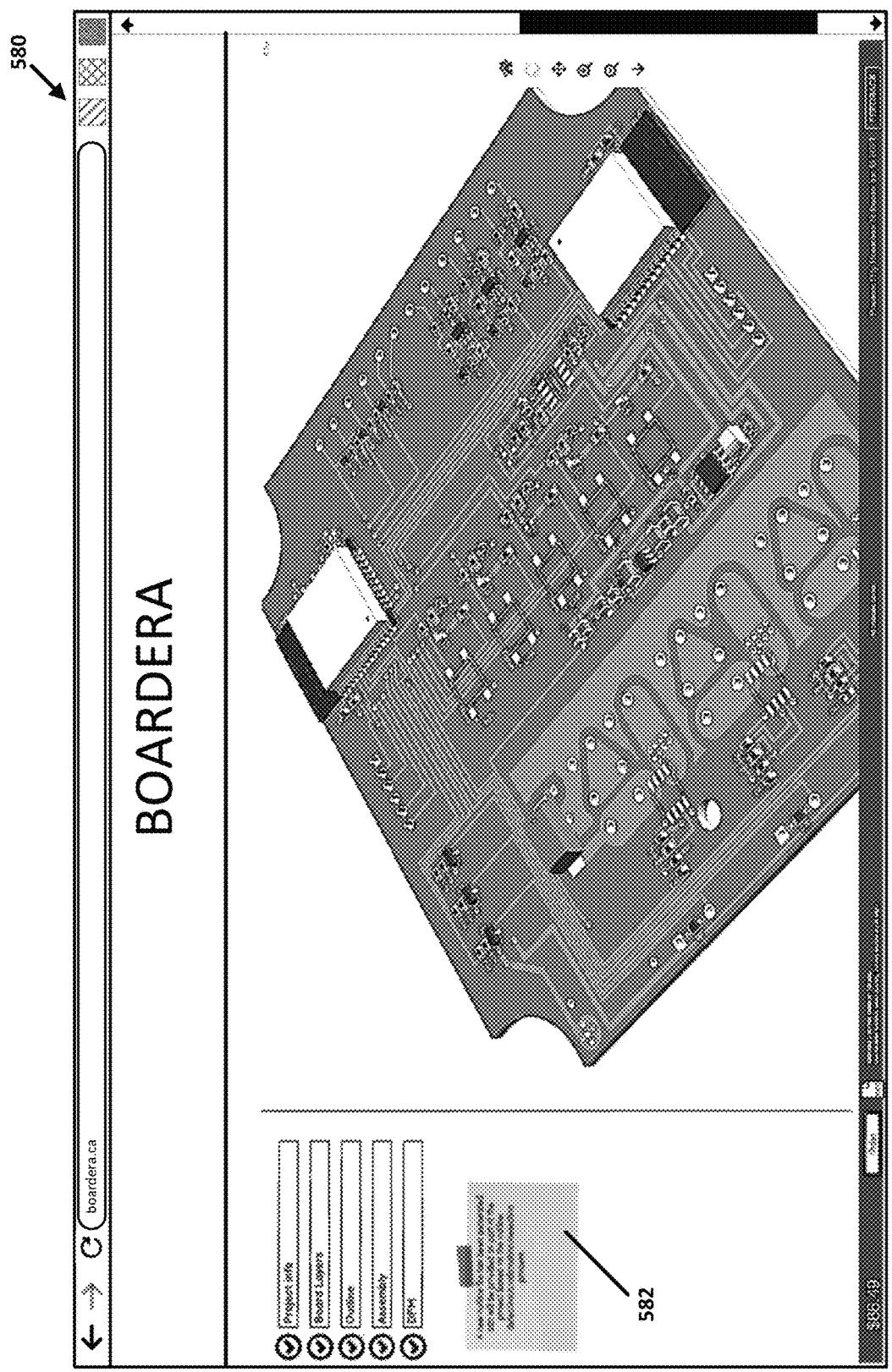
FIG. 16 is a user interface provided on the display device for confirming that, in accordance with the approval of an estimated, modified or custom created PCB physical outline, a new PCB outline file has been generated.

FIG. 16 is a user interface 580 provided on the display device showing Project Information, Board Layers, Outline, Assembly and DFM stages are complete, and displaying a confirmation message 582 for confirming that, in accordance with the approval of an estimated, modified or custom created PCB physical outline, a new PCB outline file has been generated.

In some embodiments, user involvement in the approval of an estimated physical outline may not be required, such that an estimated physical outline may be determined and used to automatically generate an outline PCB design file and/or to be electronically stored in association with the PCB design without necessarily requiring user approval of the estimated physical outline.

Figure 17:
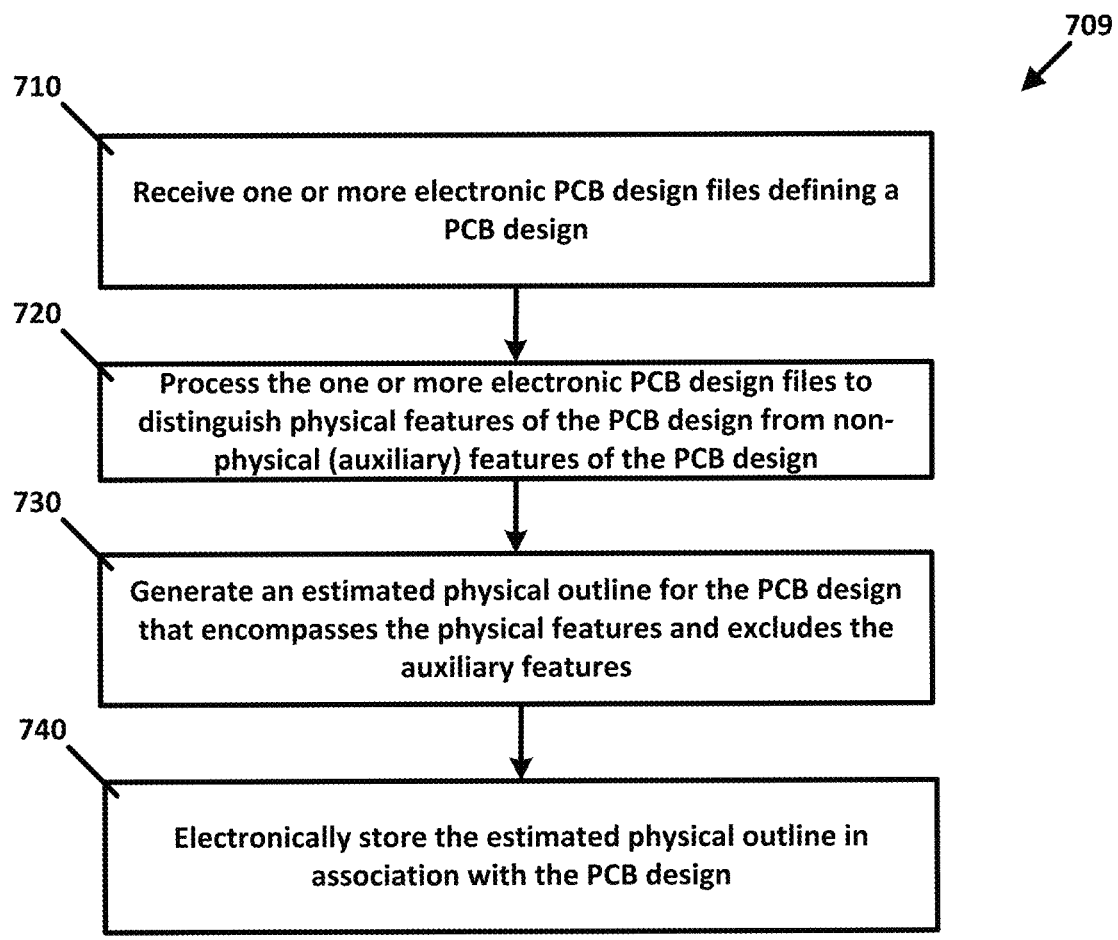
FIG. 17 is a flow diagram generally illustrating a printed circuit board (PCB) outline generation method according to the principles of the present disclosure.

FIG. 17 is a flow diagram generally illustrating a printed circuit board (PCB) outline generation method 709 according to the principles of the present disclosure. In some embodiments, at 710, one or more electronic PCB design files defining a PCB design are received. Such receiving may be conducted as described herein. In some embodiments, as described herein, PCB design files may be formatted according to a Gerber format, an ODB++ format, or some other format that may encode information about the various layers and aspects of PCB design in one or more files. At 720, the one or more electronic PCB design files are processed to distinguish physical features of the PCB design from nonphysical (auxiliary) features of the PCB design. Such processing may be conducted as described herein. At 730, an estimated physical outline for the PCB design that encompasses the physical features and excludes the auxiliary features is generated. Such generating may be conducted as described herein. At 740, the estimated physical outline is electronically stored in association with the PCB design. The electronic storing may be conducted using structures and processes as described herein.

In some embodiments, pursuant to the electronic storing, an outline PCB design file corresponding to the PCB design may be automatically created or—if an outline PCB design file was already part of the PCB design files, such outline PCB design file may itself be modified—based on the estimated physical outline.

In some embodiments, features of the PCB design as encompassed by the estimated physical outline may be graphically displayed, such as on a display device as described herein, and a user interface control may be provided for approval of the estimated physical outline based on the estimated physical outline correctly encompassing the physical features of the PCB design.

CLAUSES

1. A system for printed circuit board (PCB) outline approval comprising: a user interface provided on a display device for graphically displaying a representation of a PCB design; a user interface provided on the display device for graphically displaying features of the PCB design as encompassed by an automatically estimated physical outline of physical features of the PCB design; and a user interface control for approving the automatically estimated physical outline as correctly encompassing the physical features of the PCB design.

2. The system of clause 1, further comprising: a user interface control for receiving at least one modification to the automatically estimated physical outline thereby to generate a modified physical outline; and a user interface control for approving the modified physical outline as correctly encompassing the physical features of the PCB design.

3. The system of clause 1, further comprising: a user interface control for creating and displaying on the display device a custom physical outline for encompassing physical features of the PCB design; and a user interface control for approving the custom physical outline as correctly encompassing the physical features of the PCB design.

4. The system of clause 1, further comprising: a user interface for inputting PCB design files; wherein the automatically estimated physical outline is generated based at least on contents of the PCB design files.

5. The system of clause 4, further comprising: an outline file generator for, responsive to the approving, automatically generating an outline PCB design file based on the automatically estimated physical outline.

6. The system of clause 4, wherein the PCB design files are one of: Gerber PCB design files and ODB++ PCB design files.

7. The system of clause 1, wherein the user interface provided on the display device for graphically displaying features of the PCB design as encompassed by the automatically estimated physical outline of physical features of the PCB design is configured to: display only the features of the PCB design encompassed by the automatically estimated physical outline.

8. The system of clause 1, wherein the user interface provided on the display device for graphically displaying features of the PCB design as encompassed by the automatically estimated physical outline of physical features of the PCB design is configured to: display a graphical representation of the automatically estimated physical outline in association with the representation of the PCB design.

9. The system of clause 1, wherein the user interface provided on the display device for graphically displaying features of the PCB design as encompassed by the automatically estimated physical outline of physical features of the PCB design is configured to: display the features of the PCB design encompassed by the automatically estimated physical outline in a manner graphically distinct from features of the PCB design that are not encompassed by the automatically estimated physical outline.

10. The system of clause 9, wherein the graphically distinct manner is a distinct colour or colours and/or a district contrast.

11. A method for printed circuit board (PCB) outline approval comprising: graphically displaying, on a display device, a representation of a PCB design; graphically displaying, on the display device, features of the PCB design as encompassed by an automatically estimated physical outline of physical features of the PCB design; and providing a user interface control for approving the automatically estimated physical outline as correctly encompassing the physical features of the PCB design.

12. The method of clause 11, comprising: providing a user interface control for receiving at least one modification to the automatically estimated physical outline thereby to generate a modified physical outline; and providing a user interface control for approving the modified physical outline as correctly encompassing the physical features of the PCB design.

13. The method of clause 11, comprising: providing a user interface control for creating and displaying on the display device a custom physical outline for encompassing physical features of the PCB design; and providing a user interface control for approving the custom physical outline as correctly encompassing the physical features of the PCB design.

14. The method of clause 11, comprising: providing a user interface control for inputting PCB design files; wherein the automatically estimated physical outline is generated based at least on contents of the PCB design files.

15. The method of clause 14, comprising: responsive to the approving, automatically generating an outline PCB design file based on the estimated physical outline.

16. The method of clause 14, wherein the PCB design files are one of: Gerber PCB design files and ODB++ PCB design files.

17. The method of clause 11, wherein graphically displaying features of the PCB design as encompassed by the automatically estimated physical outline of physical features of the PCB design comprises: displaying only the features of the PCB design encompassed by the automatically estimated physical outline.

18. The method of clause 11, wherein graphically displaying features of the PCB design as encompassed by the automatically estimated physical outline of physical features of the PCB design comprises: displaying a graphical representation of the automatically estimated physical outline in association with the representation of the PCB design.

19. The method of clause 11, wherein graphically displaying features of the PCB design as encompassed by the automatically estimated physical outline of physical features of the PCB design comprises: displaying the features of the PCB design encompassed by the automatically estimated physical outline in a manner graphically distinct from features of the PCB design that are not encompassed by the estimated physical outline.

20. The method of clause 19, wherein the graphically distinct manner is a distinct colour or colours and/or a distinct contrast and/or a distinct transparency.

21. A non-transitory computer readable medium embodying a computer program executable on at least one processor for printed circuit board (PCB) outline approval, the computer program comprising: computer program code for graphically displaying, on a display device, a representation of a PCB design; computer program code for graphically displaying, on the display device, features of the PCB design as encompassed by an automatically estimated physical outline of physical features of the PCB design; and computer program code for providing a user interface control for approving the automatically estimated physical outline as correctly encompassing the physical features of the PCB design.

22. The non-transitory computer readable medium of clause 21, the computer program comprising: computer program code for providing a user interface control for receiving at least one modification to the automatically estimated physical outline thereby to generate a modified physical outline; and computer program code for providing a user interface control for approving the modified physical outline as correctly encompassing the physical features of the PCB design.

23. The non-transitory computer readable medium of clause 21, the computer program comprising: computer program code for providing a user interface control for creating and displaying on the display device a custom physical outline for encompassing physical features of the PCB design; and computer program code for providing a user interface control for approving the custom physical outline as correctly encompassing the physical features of the PCB design.

24. The non-transitory computer readable medium of clause 21, the computer program comprising: computer program code for providing a user interface control for inputting PCB design files, wherein the automatically estimated physical outline is generated automatically based at least on contents of the PCB design files.

25. The non-transitory computer readable medium of clause 24, the computer program comprising: computer program code for responsive to the approving, automatically generating an outline PCB design file based on the automatically estimated physical outline.

26. The non-transitory computer readable medium of clause 24, wherein the PCB design files are one of: Gerber PCB design files and ODB++ PCB design files.

27. The non-transitory computer readable medium of clause 21, wherein the computer program code for graphically displaying features of the PCB design as encompassed by the automatically estimated physical outline of physical features of the PCB design comprises: computer program code for displaying only the features of the PCB design encompassed by the automatically estimated physical outline.

28. The non-transitory computer readable medium of clause 21, wherein the computer program code for graphically displaying features of the PCB design as encompassed by the automatically estimated physical outline of physical features of the PCB design comprises: computer program code for displaying a graphical representation of the automatically estimated physical outline in association with the representation of the PCB design.

29. The non-transitory computer readable medium of clause 21, wherein the computer program code for graphically displaying features of the PCB design as encompassed by the automatically estimated physical outline of physical features of the PCB design comprises: computer program code for displaying the features of the PCB design encompassed by the automatically estimated physical outline in a graphically distinct manner from features of the PCB design that are not encompassed by the automatically estimated physical outline.

30. The non-transitory computer readable medium of clause 29, wherein the graphically distinct manner is a distinct colour or colours and/or a district contrast.

31. A system for printed circuit board (PCB) outline approval comprising: at least one processor configured to automatically generate, based at least on contents of electronic PCB design files, an estimated physical outline for encompassing physical features of a PCB design; a user interface for graphically displaying features of the PCB design as encompassed by the estimated physical outline; and a user interface control for approval of the estimated physical outline based on the estimated physical outline correctly encompassing the physical features of the PCB design.

32. The system of clause 31, wherein the at least one processor configured to automatically generate is configured to: identify at least some of the physical features in the PCB design based at least on relative positioning of conductive and mask layer features in the PCB design; generate a set of one or more candidate physical outlines each fully encompassing at least a threshold number of the physical features; and select, as the estimated physical outline, one of the candidate physical outlines based on a selection process.

33. The system of clause 32, wherein the at least one processor configured to identify at least some of the physical features in the PCB design is configured to: convert conductive and mask draw commands in the PCB design files to combined conductive polygons and combined mask polygons; generate a conductive polygon image in which the combined conductive polygons are represented as conductive pixels; generate a mask polygon image in which the combined mask polygons are represented as mask pixels; conduct an AND operation with the conductive polygon image and the mask polygon image thereby to generate a coincidence image in which pixels represent locations at which conductive and mask pixels coincide; conduct an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; and generate edge polygons for each edge in the coincidence image that aligns with an edge in the discrepancy image, wherein the edge polygons represent the physical features.

34. The system of clause 33, wherein the at least one processor configured to convert conductive and mask draw commands in the PCB design files to combined conductive polygons and combined mask polygons is configured to: convert each of the mask draw commands into individual mask polygons; convert conductive draw commands into individual conductive polygons; combine individual conductive polygons to form the combined conductive polygons; and combine individual mask polygons to form the combined mask polygons.

36. The system of clause 32, wherein the at least one processor configured to automatically generate is configured to: in the event that the PCB design files includes an outline file, include as a candidate physical outline only physical outlines in the outline file that fully encompass the threshold number of the physical features; and otherwise: include as a candidate physical outline only physical outlines in non-internal and non-drill layer PCB design files that would fully encompass the threshold number of the physical features.

37. The system of clause 36, wherein the at least one processor is configured to, during the selection process: select from only the candidate physical outlines in the set that encompass at least a threshold area.

38. The system of clause 37, wherein the at least one processor is configured to, during the selection process: select from only the candidate physical outlines in the set having at least a threshold excavation area.

39. The system of clause 38, wherein the at least one processor is configured to, during the selection process: select from only the candidate physical outlines in the set encompassing at least a threshold number of the physical features.

40. The system of clause 39, wherein the at least one processor is configured to, during the selection process: sort the one or more candidate physical outlines by area; and select as the estimated physical outline the largest of the candidate physical outlines having an area that is less than a threshold amount greater than that of the smallest of the candidate physical outlines.

41. The system of clause 32, wherein at least one of the physical features corresponds to an electrical contact in the PCB design.

42. The system of clause 31, wherein a plurality of estimated physical outlines are generated based on the electronic PCB design files, the system comprising: a user interface control for approving one of the plurality of estimated physical outlines as correctly encompassing the physical features of the PCB design.

43. A method for printed circuit board (PCB) outline approval comprising: automatically generating, based at least on contents of electronic PCB design files, an estimated physical outline for encompassing physical features of a PCB design; graphically displaying features of the PCB design as encompassed by the estimated physical outline; and providing a user interface control for approval of the estimated physical outline based on the estimated physical outline correctly encompassing the physical features of the PCB design.

44. The method of clause 43, wherein the automatically generating comprises: identifying at least some of the physical features in the PCB design based at least on relative positioning of conductive and mask layer features in the PCB design; generating a set of one or more candidate physical outlines each fully encompassing at least a threshold number of the physical features; and selecting, as the estimated physical outline, one of the candidate physical outlines based on a selection process.

45. The method of clause 44, wherein identifying physical features comprises: converting conductive and mask draw commands in the PCB design files to combined conductive polygons and combined mask polygons; generating a conductive polygon image in which the combined conductive polygons are represented as conductive pixels; generating a mask polygon image in which the combined mask polygons are represented as mask pixels; conducting an AND operation with the conductive polygon image and the mask polygon image thereby to generate a coincidence image in which pixels represent locations at which conductive and mask pixels coincide; conducting an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; generating edge polygons for each edge in the coincidence image that aligns with an edge in the discrepancy image, wherein the edge polygons represent the identified physical features.

46. The method of clause 45, wherein converting conductive and mask draw commands in the PCB design files to respective conductive and mask polygons comprises: converting each of the mask draw commands into individual mask polygons; converting conductive draw commands into individual conductive polygons; combining individual conductive polygons to form the combined conductive polygons; and combining individual mask polygons to form the combined mask polygons.

48. The method of clause 44, wherein the generating of the one or more candidate physical outlines comprises: in the event that the PCB design files includes an outline file, including as a candidate physical outline only physical outlines in the outline file that fully encompass the threshold number of the physical features; and otherwise: including as a candidate physical outline only physical outlines in non-internal and non-drill layer PCB design files that would fully encompass the threshold number of physical features.

49. The method of clause 48, wherein the selection process comprises: selecting from only the candidate physical outlines in the set that encompass at least a threshold area.

50. The method of clause 49, wherein the selection process comprises: selecting from only the candidate physical outlines in the set having at least a threshold excavation area.

51. The method of clause 50, wherein the selection process comprises: filtering out one or more candidate outlines encompassing less than a threshold amount of the physical features.

52. The method of clause 51, wherein the selection process comprises: sorting the one or more candidate physical outlines by area; and selecting as the estimated physical outline the largest of the candidate physical outlines having an area that is less than a threshold amount greater than that of the smallest of the candidate physical outlines.

53. The method of clause 44, wherein at least one of the physical features corresponds to an electrical contact in the PCB design.

54. The method of clause 43, wherein a plurality of estimated physical outlines are generated based on the electronic PCB design files, the method comprising: providing a user interface control for approving one of the plurality of estimated physical outlines as correctly encompassing the physical features of the PCB design.

55. A non-transitory computer readable medium embodying a computer program executable on at least one processor for printed circuit board (PCB) outline approval, the computer program comprising: computer program code for automatically generating, based at least on contents of electronic PCB design files, an estimated physical outline for encompassing physical features of a PCB design; computer program code for graphically displaying features of the PCB design as encompassed by the estimated physical outline; and computer program code for providing a user interface control for approval of the estimated physical outline based on the estimated physical outline correctly encompassing the physical features of the PCB design.

56. The non-transitory computer readable medium of clause 55, wherein the computer program code for automatically generating comprises: computer program code for identifying at least some of the physical features in the PCB design based at least on relative positioning of conductive and mask layer features in the PCB design; computer program code for generating a set of one or more candidate physical outlines each fully encompassing at least a threshold number of the physical features; and computer program code for selecting, as the estimated physical outline, one of the candidate physical outlines based on a selection process.

57. The non-transitory computer readable medium of clause 56, wherein the computer program code for identifying physical features comprises: computer program code for converting conductive and mask draw commands in the PCB design files to combined conductive polygons and combined mask polygons; computer program code for generating a conductive polygon image in which the combined conductive polygons are represented as conductive pixels; computer program code for generating a mask polygon image in which the combined mask polygons are represented as mask pixels; computer program code for conducting an AND operation with the conductive polygon image and the mask polygon image thereby to generate a coincidence image in which pixels represent locations at which conductive and mask pixels coincide; computer program code for conducting an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; and computer program code for generating edge polygons for each edge in the coincidence image that aligns with an edge in the discrepancy image, wherein the edge polygons represent identified physical features.

58. The non-transitory computer readable medium of clause 57, wherein the computer program code for converting conductive and mask draw commands in the PCB design files to respective conductive and mask polygons comprises: computer program code for converting each of the mask draw commands into individual mask polygons; computer program code for converting conductive draw commands into individual conductive polygons; computer program code for combining individual conductive polygons to form the combined conductive polygons; and computer program code for combining individual mask polygons to form the combined mask polygons.

60. The non-transitory computer readable medium of clause 56, wherein the computer program code for generating a set of one or more candidate physical outlines comprises: computer program code for: in the event that the PCB design files includes an outline file, including as a candidate physical outline only physical outlines in the outline file that fully encompass the threshold number of the physical features; and otherwise: include as a candidate physical outline only physical outlines in non-internal and non-drill layer PCB design files that would fully encompass the threshold number of the physical features.

61. The non-transitory computer readable medium of clause 60, wherein the selection process comprises: selecting from only the candidate physical outlines in the set that encompass at least a threshold area.

62. The non-transitory computer readable medium of clause 61, wherein the selection process comprises: selecting from only the candidate physical outlines in the set having at least a threshold excavation area.

63. The non-transitory computer readable medium of clause 62, wherein the selection process comprises: filtering out one or more candidate outlines having less than a threshold amount of the physical features.

64. The non-transitory computer readable medium of clause 63, wherein the selection process comprises: sorting the one or more candidate physical outlines by area; and selecting as the estimated physical outline the largest of the candidate physical outlines having an area that is less than a threshold amount greater than that of the smallest of the candidate physical outlines.

65. The non-transitory computer readable medium of clause 56, wherein at least one of the physical features corresponds to an electrical contact in the PCB design.

66. The non-transitory computer readable medium of clause 55, wherein a plurality of estimated physical outlines are generated based on the electronic PCB design files, the computer program comprising: computer program code for providing a user interface control for approving one of the plurality of estimated physical outlines as correctly encompassing the physical features of the PCB design.

67. A system for printed circuit board (PCB) outline generation comprising: at least one processor configured to: receive one or more electronic PCB design files defining a PCB design; process the one or more electronic PCB design files to distinguish physical features of the PCB design from non-physical (auxiliary) features of the PCB design; generate an estimated physical outline for the PCB design that encompasses the physical features and excludes the auxiliary features; and electronically store the estimated physical outline in association with the PCB design.

68. The system of clause 67, wherein the at least one processor is further configured to: automatically create or modify an outline PCB design file corresponding to the PCB design based on the estimated physical outline.

69. The system of clause 67, further comprising: a user interface for graphically displaying features of the PCB design as encompassed by the estimated physical outline; and a user interface control for approval of the estimated physical outline based on the estimated physical outline correctly encompassing the physical features of the PCB design.

70. The system of clause 67, wherein the at least one processor is configured to generate an estimated physical outline by: identifying at least some of the physical features in the PCB design based at least on relative positioning of conductive and mask layer features in the PCB design; generating a set of one or more candidate physical outlines each fully encompassing at least a threshold number of the physical features; and selecting, as the estimated physical outline, one of the candidate physical outlines based on a selection process.

71. The system of clause 70, wherein the at least one processor is configured to identify at least some of the physical features by: converting conductive and mask draw commands in the PCB design files to combined conductive polygons and combined mask polygons; generating a conductive polygon image in which the combined conductive polygons are represented as conductive pixels; generating a mask polygon image in which the combined mask polygons are represented as mask pixels; conducting an AND operation with the conductive polygon image and the mask polygon image thereby to generate a coincidence image in which pixels represent locations at which conductive and mask pixels coincide; conducting an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; and generating edge polygons for each edge in the coincidence image that aligns with an edge in the discrepancy image, wherein the edge polygons represent the identified physical features.

72. The system of clause 71, wherein the at least one processor is configured to convert conductive and mask draw commands in the PCB design files to respective conductive and mask polygons by: converting each of the mask draw commands into individual mask polygons; converting conductive draw commands into individual conductive polygons; combining individual conductive polygons to form the combined conductive polygons; and combining individual mask polygons to form the combined mask polygons.

74. The system of clause 70, wherein the at least one processor is configured to generate a set of one or more candidate physical outlines by: in the event that the one or more PCB design file includes an outline PCB design file, including as a candidate physical outline only physical outlines in the outline PCB design file that fully encompass the threshold number of the physical features; and otherwise: including as a candidate physical outline only physical outlines in non-internal and non-drill layer PCB design files that would fully encompass the threshold number of the physical features.

75. The system of clause 70, wherein the selection process comprises: selecting from only the candidate physical outlines in the set that encompass at least a threshold area.

76. The system of clause 75, wherein the selection process comprises: selecting from only the candidate physical outlines in the set having at least a threshold excavation area.

77. The system of clause 76, wherein the selection process comprises: filtering out one or more candidate outlines encompassing less than a threshold amount of the physical features.

78. The system of clause 77, wherein the selection process comprises: sorting the one or more candidate physical outlines by area; and selecting as the estimated physical outline the largest of the candidate physical outlines having an area that is less than a threshold amount greater than that of the smallest of the candidate physical outlines.

79. A method for printed circuit board (PCB) outline generation comprising: receiving one or more electronic PCB design files defining a PCB design; processing the one or more electronic PCB design files to distinguish physical features of the PCB design from non-physical (auxiliary) features of the PCB design; generating an estimated physical outline for the PCB design that encompasses the physical features and excludes the auxiliary features; and electronically storing the estimated physical outline in association with the PCB design.

80. The method of clause 79, further comprising: automatically creating or modifying an outline PCB design file corresponding to the PCB design based on the estimated physical outline.

81. The method of clause 79, further comprising: graphically displaying features of the PCB design as encompassed by the estimated physical outline; and providing a user interface control for approval of the estimated physical outline based on the estimated physical outline correctly encompassing the physical features of the PCB design.

82. The method of clause 79, wherein the generating an estimated physical outline comprises: identifying at least some of the physical features in the PCB design based at least on relative positioning of conductive and mask layer features in the PCB design; generating a set of one or more candidate physical outlines each fully encompassing at least a threshold number of the physical features; and selecting, as the estimated physical outline, one of the candidate physical outlines based on a selection process.

83. The method of clause 82, wherein identifying physical features comprises: converting conductive and mask draw commands in the PCB design files to combined conductive polygons and combined mask polygons; generating a conductive polygon image in which the combined conductive polygons are represented as conductive pixels; generating a mask polygon image in which the combined mask polygons are represented as mask pixels; conducting an AND operation with the conductive polygon image and the mask polygon image thereby to generate a coincidence image in which pixels represent locations at which conductive and mask pixels coincide; conducting an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; and generating edge polygons for each edge in the coincidence image that aligns with an edge in the discrepancy image, wherein the edge polygons represent the identified physical features.

84. The method of clause 83, wherein converting conductive and mask draw commands in the PCB design files to respective conductive and mask polygons comprises: converting each of the mask draw commands into individual mask polygons; converting conductive draw commands into individual conductive polygons; combining individual conductive polygons to form the combined conductive polygons; and combining individual mask polygons to form the combined mask polygons.

86. The method of clause 82, wherein generating a set of one or more candidate physical outlines comprises: in the event that the one or more PCB design file includes an outline PCB design file, including as a candidate physical outline only physical outlines in the outline PCB design file that fully encompass the threshold number of the physical features; and otherwise: including as a candidate physical outline only physical outlines in non-internal and non-drill layer PCB design files that would fully encompass the threshold number of the physical features.

87. The method of clause 82, wherein the selection process comprises: selecting from only the candidate physical outlines in the set that encompass at least a threshold area.

88. The method of clause 87, wherein the selection process comprises: selecting from only the candidate physical outlines in the set having at least a threshold excavation area.

89. The method of clause 88, wherein the selection process comprises: filtering out one or more candidate outlines encompassing less than a threshold amount of the physical features.

90. The method of clause 89, wherein the selection process comprises: sorting the one or more candidate physical outlines by area; and selecting as the estimated physical outline the largest of the candidate physical outlines having an area that is less than a threshold amount greater than that of the smallest of the candidate physical outlines.

91. A non-transitory computer readable medium embodying a computer program executable on at least one processor for printed circuit board (PCB) outline generation, the computer program comprising: computer program code for receiving one or more electronic PCB design files defining a PCB design; computer program code for processing the one or more electronic PCB design files to distinguish physical features of the PCB design from non-physical (auxiliary) features of the PCB design; computer program code for generating an estimated physical outline for the PCB design that encompasses the physical features and excludes the auxiliary features; and computer program code for electronically storing the estimated physical outline in association with the PCB design.

92. The non-transitory computer readable medium of clause 91, further comprising: computer program code for automatically creating or modifying an outline PCB design file corresponding to the PCB design based on the estimated physical outline.

93. The non-transitory computer readable medium of clause 91, further comprising: computer program code for graphically displaying features of the PCB design as encompassed by the estimated physical outline; and computer program code for providing a user interface control for approval of the estimated physical outline based on the estimated physical outline correctly encompassing the physical features of the PCB design.

94. The non-transitory computer readable medium of clause 91, wherein the computer program code for generating an estimated physical outline comprises: computer program code for identifying at least some of the physical features in the PCB design based on relative positioning of conductive and mask layer features in the PCB design; computer program code for generating a set of one or more candidate physical outlines each fully encompassing at least a threshold number of the physical features; and computer program code for selecting, as the estimated physical outline, one of the candidate physical outlines based on a selection process.

95. The non-transitory computer readable medium of clause 94, wherein the computer program code for identifying physical features comprises: computer program code for converting conductive and mask draw commands in the PCB design files to combined conductive polygons and combined mask polygons; computer program code for generating a conductive polygon image in which the combined conductive polygons are represented as conductive pixels; computer program code for generating a mask polygon image in which the combined mask polygons are represented as mask pixels; computer program code for conducting an AND operation with the conductive polygon image and the mask polygon image thereby to generate a coincidence image in which pixels represent locations at which conductive and mask pixels coincide; computer program code for conducting an XOR operation using the conductive polygon image and the mask polygon image thereby to generate a discrepancy image in which pixels represent locations at which: there are conductive pixels that do not coincide with mask pixels; or there are mask pixels that do not coincide with conductive pixels; and computer program code for generating edge polygons for each edge in the coincidence image that aligns with an edge in the discrepancy image, wherein the edge polygons represent the identified physical features.

96. The non-transitory computer readable medium of clause 95, wherein the computer program code for converting conductive and mask draw commands in the PCB design files to respective conductive and mask polygons comprises: computer program code for converting each of the mask draw commands into individual mask polygons; computer program code for converting conductive draw commands into individual conductive polygons; computer program code for combining individual conductive polygons to form the combined conductive polygons; and computer program code for combining individual mask polygons to form the combined mask polygons.

98. The non-transitory computer readable medium of clause 94, wherein the computer program code for generating a set of one or more candidate physical outlines comprises: computer program code for: in the event that the one or more PCB design file includes an outline PCB design file, including as a candidate physical outline only physical outlines in the outline PCB design file that fully encompass the threshold number of the physical features; and otherwise: including as a candidate physical outline only physical outlines in non-internal and non-drill layer PCB design files that would fully encompass the threshold number of the physical features.

99. The non-transitory computer readable medium of clause 94, wherein the selection process comprises: selecting from only the candidate physical outlines in the set that encompass at least a threshold area.

100. The non-transitory computer readable medium of clause 99, wherein the selection process comprises: selecting from only the candidate physical outlines in the set having at least a threshold excavation area.

101. The non-transitory computer readable medium of clause 100, wherein the selection process comprises: filtering out one or more candidate outlines encompassing less than a threshold amount of the physical features.

102. The non-transitory computer readable medium of clause 101, wherein the selection process comprises: sorting the one or more candidate physical outlines by area; and selecting as the estimated physical outline the largest of the candidate physical outlines having an area that is less than a threshold amount greater than that of the smallest of the candidate physical outlines.

Although embodiments have been described, those of skill in the art will appreciate that variations and modifications may be made without departing from the spirit, scope and purpose of the invention as defined by the appended claims.

What is claimed is:

1. A system for printed circuit board (PCB) outline generation comprising:
at least one processor configured to:
receive one or more electronic PCB design files for configuring a manufacturing machine to manufacture a PCB, the one or more electronic PCB design files defining a PCB design;
process the one or more electronic PCB design files to distinguish physical features of the PCB design from non-physical (auxiliary) features of the PCB design including identifying at least some of the physical features in the PCB design based at least on relative positioning of conductive and mask layer features in the PCB design;
generate an estimated physical outline for the PCB design that encompasses the physical features and excludes the auxiliary features; and
electronically store the estimated physical outline in association with the PCB design,
wherein the at least one processor is configured to generate an estimated physical outline by:
generating a set of one or more candidate physical outlines each fully encompassing at least a threshold number of the physical res; and
selecting, as the estimated physical outline, one of the candidate physical outlines based on a selection process.

2. The system of claim 1, wherein the at least one processor is further configured to:
automatically create or modify an encoding of the estimated physical outline corresponding to the PCB design based on the estimated physical outline.

3. The system of claim 1, further comprising:
a user interface for graphically displaying features of the PCB design as encompassed by the estimated physical outline; and
a user interface control for approval of the estimated physical outline based on the estimated physical outline correctly encompassing the physical features of the PCB design.

4. The system of claim 1, wherein the at least one processor is configured to identify at least some of the physical features by:
converting conductive and mask draw commands in the PCB design files to combined conductive polygons and combined mask polygons;
generating a conductive polygon image in which the combined conductive polygons are represented as conductive pixels;
generating a mask polygon image in which the combined mask polygons are represented as mask pixels;
conducting an AND operation with the conductive polygon image and the mask polygon image thereby to generate a coincidence image in which pixels represent locations at which conductive and mask pixels coincide;
conducting an XOR operation using the conductive polygon image and the mask polygon image thereby to generate a discrepancy image in which pixels represent locations at which:
there are conductive pixels that do not coincide with mask pixels; or
there are mask pixels that do not coincide with conductive pixels; and
generating edge polygons for each edge in the coincidence image that aligns with an edge in the discrepancy image, wherein the edge polygons represent the identified physical features.

5. The system of claim 4, wherein the at least one processor is configured to convert conductive and mask draw commands in the PCB design files to respective conductive and mask polygons by:
converting each of the mask draw commands into individual mask polygons;
converting conductive draw commands into individual conductive polygons;
combining individual conductive polygons to form the combined conductive polygons; and
combining individual mask polygons to form the combined mask polygons.

6. The system of claim 4, wherein the at least one processor is configured to generate a set of one or more candidate physical outlines by:
in the event that the one or more PCB design file includes an outline PCB design file, including as a candidate physical outline only physical outlines in the outline PCB design file that fully encompass the threshold number of the physical features; and otherwise:
including as a candidate physical outline only physical outlines in non-internal and non-drill layer PCB design files that would fully encompass the threshold number of the physical features.

7. The system of claim 4, wherein the selection process comprises:
selecting from only the candidate physical outlines in the set that encompass at least a threshold area.

8. The system of claim 7, wherein the selection process comprises:
selecting from only the candidate physical outlines in the set having at least a threshold excavation area.

9. The system of claim 8, wherein the selection process comprises:
filtering out one or more candidate outlines encompassing less than a threshold amount of the physical features.

10. The system of claim 9, wherein the selection process comprises:
sorting the one or more candidate physical outlines by area; and
selecting as the estimated physical outline the largest of the candidate physical outlines having an area that is less than a threshold amount greater than that of the smallest of the candidate physical outlines.

11. A method for printed circuit board (PCB) outline generation comprising:
receiving one or more electronic PCB design files for configuring a manufacturing machine to manufacture a PCB, the one or more electronic PCB design files defining a PCB design;
processing the one or more electronic PCB design files to distinguish physical features of the PCB design from non-physical (auxiliary) features of the PCB design including identifying at least some of the physical features in the PCB design based at least on relative positioning of conductive and mask layer features in the PCB design;

generating an estimated physical outline for the PCB design that encompasses the physical features and excludes the auxiliary features; and electronically storing the estimated physical outline in association with the PCB design, wherein the generating an estimated physical outline comprises:

generating a set of one or more candidate physical outlines each fully encompassing at least a threshold number of the physical features; and selecting as the estimated physical outline, one of the candidate physical outlines based on a selection process.

12. The method of claim 11, further comprising:
automatically creating or modifying an encoding of the estimated physical outline corresponding to the PCB design based on the estimated physical outline.

13. The method of claim 11, further comprising:
graphically displaying features of the PCB design as encompassed by the estimated physical outline; and
providing a user interface control for approval of the estimated physical outline based on the estimated physical outline correctly encompassing the physical features of the PCB design.

14. The method of claim 11, wherein identifying physical features comprises:
converting conductive and mask draw commands in the PCB design files to combined conductive polygons and combined mask polygons;
generating a conductive polygon image in which the combined conductive polygons are represented as conductive pixels;
generating a mask polygon image in which the combined mask polygons are represented as mask pixels;
conducting an AND operation with the conductive polygon image and the mask polygon image thereby to generate a coincidence image in which pixels represent locations at which conductive and mask pixels coincide;
conducting an XOR operation using the conductive polygon image and the mask polygon image thereby to generate a discrepancy image in which pixels represent locations at which:
there are conductive pixels that do not coincide with mask pixels; or
there are mask pixels that do not coincide with conductive pixels; and
generating edge polygons for each edge in the coincidence image that aligns with an edge in the discrepancy image, wherein the edge polygons represent the identified physical features.

15. The method of claim 14, wherein converting conductive and mask draw commands in the PCB design files to respective conductive and mask polygons comprises:
converting each of the mask draw commands into individual mask polygons;
converting conductive draw commands into individual conductive polygons;
combining individual conductive polygons to form the combined conductive polygons; and
combining individual mask polygons to form the combined mask polygons.

16. The method of claim 11, wherein generating a set of one or more candidate physical outlines comprises:

in the event that the one or more PCB design file includes an outline PCB design file, including as a candidate physical outline only physical outlines in the outline PCB design file that fully encompass the threshold number of the physical features; and otherwise:
including as a candidate physical outline only physical outlines in non-internal and non-drill layer PCB design files that would fully encompass the threshold number of the physical features.

17. The method of claim 11, wherein the selection process comprises:
selecting from only the candidate physical outlines in the set that encompass at least a threshold area.

18. The method of claim 17, wherein the selection process comprises:
selecting from only the candidate physical outlines in the set having at least a threshold excavation area.

19. The method of claim 18, wherein the selection process comprises:
filtering out one or more candidate outlines encompassing less than a threshold amount of the physical features.

20. The method of claim 19, wherein the selection process comprises:
sorting the one or more candidate physical outlines by area; and
selecting as the estimated physical outline the largest of the candidate physical outlines having an area that is less than a threshold amount greater than that of the smallest of the candidate physical outlines.

21. A non-transitory computer readable medium embodying a computer program executable on at least one processor for printed circuit board (PCB) outline generation, the computer program comprising:
computer program code for receiving one or more electronic PCB design files for configuring a manufacturing machine to manufacture a PCB, the one or more electronic PCB design files defining a PCB design;
computer program code for processing the one or more electronic PCB design files to distinguish physical features of the PCB design from non-physical (auxiliary) features of the PCB design, including computer program code for identifying at least some of the physical features in the PCB design based at least on relative positioning of conductive and mask layer features in the PCB design;
computer program code for generating an estimated physical outline for the PCB design that encompasses the physical features and excludes the auxiliary features; and
computer program code for electronically storing the estimated physical outline in association with the PCB design,
wherein the computer program code for generating an estimated physical outline comprises:
computer program code for generating a set of one or more candidate physical outlines each fully encompassing at least a threshold number of the physical features; and
computer program code for selecting, as the estimated physical outline one of the candidate physical outlines based on a selection process.

22. The non-transitory computer readable medium of claim 21, further comprising:
computer program code for automatically creating or modifying an encoding of the estimated physical outline corresponding to the PCB design based on the estimated physical outline.

23. The non-transitory computer readable medium of claim 21, further comprising:
    computer program code for graphically displaying features of the PCB design as encompassed by the estimated physical outline; and
    computer program code for providing a user interface control for approval of the estimated physical outline based on the estimated physical outline correctly encompassing the physical features of the PCB design.

24. The non-transitory computer readable medium of claim 19, wherein the computer program code for identifying physical features comprises:
    computer program code for converting conductive and mask draw commands in the PCB design files to combined conductive polygons and combined mask polygons;
    computer program code for generating a conductive polygon image in which the combined conductive polygons are represented as conductive pixels;
    computer program code for generating a mask polygon image in which the combined mask polygons are represented as mask pixels;
    computer program code for conducting an AND operation with the conductive polygon image and the mask polygon image thereby to generate a coincidence image in which pixels represent locations at which conductive and mask pixels coincide;
    computer program code for conducting an XOR operation using the conductive polygon image and the mask polygon image thereby to generate a discrepancy image in which pixels represent locations at which:
        there are conductive pixels that do not coincide with mask pixels; or
        there are mask pixels that do not coincide with conductive pixels; and
    computer program code for generating edge polygons for each edge in the coincidence image that aligns with an edge in the discrepancy image, wherein the edge polygons represent the identified physical features.

25. The non-transitory computer readable medium of claim 24, wherein the computer program code for converting conductive and mask draw commands in the PCB design files to respective conductive and mask polygons comprises:
    computer program code for converting each of the mask draw commands into individual mask polygons;
    computer program code for converting conductive draw commands into individual conductive polygons;
    computer program code for combining individual conductive polygons to form the combined conductive polygons; and
    computer program code for combining individual mask polygons to form the combined mask polygons.

26. The non-transitory computer readable medium of claim 21, wherein the selection process comprises:
    selecting from only the candidate physical outlines in the set that encompass at least a threshold area.

27. The non-transitory computer readable medium of claim 26, wherein the computer program code for generating a set of one or more candidate physical outlines comprises:
    computer program code for:
        in the event that the one or more PCB design file includes an outline PCB design file, including as a candidate physical outline only physical outlines in the outline PCB design file that fully encompass the threshold number of the physical features; and otherwise:
        including as a candidate physical outline only physical outlines in non-internal and non-drill layer PCB design files that would fully encompass the threshold number of the physical features.

28. The non-transitory computer readable medium of claim 26, wherein the selection process comprises:
    selecting from only the candidate physical outlines in the set having at least a threshold excavation area.

29. The non-transitory computer readable medium of claim 28, wherein the selection process comprises:
    filtering out one or more candidate outlines encompassing less than a threshold amount of the physical features.

30. The non-transitory computer readable medium of claim 29, wherein the selection process comprises:
    sorting the one or more candidate physical outlines by area; and
    selecting as the estimated physical outline the largest of the candidate physical outlines having an area that is less than a threshold amount greater than that of the smallest of the candidate physical outlines.

* * * * *